US011416328B2

(12) United States Patent
Gokhale et al.

(10) Patent No.: US 11,416,328 B2
(45) Date of Patent: *Aug. 16, 2022

(54) REMOTE MONITORING AND ERROR CORRECTING WITHIN A DATA STORAGE SYSTEM

(71) Applicant: Commvault Systems, Inc., Tinton Falls, NJ (US)

(72) Inventors: Parag Gokhale, Marlboro, NJ (US); Rajiv Kottomtharayil, Marlboro, NJ (US); Srinivas Kavuri, San Jose, CA (US); Anand Prahlad, Bangalore (IN); Suresh Parpatakam Reddy, Hyderabad (IN); Robert Keith Brower, Jr., Midlothian, VA (US); Jared Meade, South River, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,692

(22) Filed: Jun. 10, 2019

(65) Prior Publication Data

US 2019/0294492 A1 Sep. 26, 2019

Related U.S. Application Data

(63) Continuation of application No. 15/685,958, filed on Aug. 24, 2017, now Pat. No. 10,671,472, which is a
(Continued)

(51) Int. Cl.
*G06F 11/07* (2006.01)
*G06F 16/21* (2019.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ........ G06F 21/00; G06F 21/60; G06F 21/604; G06F 21/606; G06F 19/322;
(Continued)

(56) References Cited

U.S. PATENT DOCUMENTS

| 4,296,465 A | 10/1981 | Lemak |
| 4,686,620 A | 8/1987 | Ng |

(Continued)

FOREIGN PATENT DOCUMENTS

| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Joseph O Schell
(74) *Attorney, Agent, or Firm* — Commvault Systems, Inc.

(57) ABSTRACT

Systems and methods for providing automated problem reporting in elements used in conjunction with computer networks are disclosed. The system comprises a plurality of elements that perform data operations and a reporting manager or monitor agent which monitors the elements and data operations. Upon detection of hardware or software problems, the reporting manager or monitor agent automatically communicates with elements affected by the problem to gather selected hardware, software, and configuration infor- (Continued)

mation, analyzes the information to determine causes of the problem, and issues a problem report containing at least a portion of the selected information. The problem report is communicated to a remote monitor that does not possess access privileges to the elements, allowing automated, remote monitoring of the elements without compromising security of the computer network or elements.

16 Claims, 8 Drawing Sheets

Related U.S. Application Data continuation of application No. 14/826,958, filed on Aug. 14, 2015, now abandoned, which is a continuation of application No. 14/139,241, filed on Dec. 23, 2013, now Pat. No. 9,122,600, which is a continuation of application No. 13/615,231, filed on Sep. 13, 2012, now Pat. No. 8,650,445, which is a continuation of application No. 11/963,732, filed on Dec. 21, 2007, now Pat. No. 8,312,323.

(60) Provisional application No. 61/190,057, filed on Dec. 22, 2006.

(51) Int. Cl.
G06F 11/14 (2006.01)
G06F 21/60 (2013.01)

(52) U.S. Cl.
CPC ...... G06F 11/0748 (2013.01); G06F 11/0751 (2013.01); G06F 11/0769 (2013.01); G06F 11/0781 (2013.01); G06F 16/214 (2019.01); G06F 11/1402 (2013.01); G06F 21/604 (2013.01)

(58) Field of Classification Search
CPC ............. G06F 11/0706; G06F 11/0709; G06F 11/0727; G06F 11/0769; G06F 16/214; G06F 11/0748; G06F 11/0751; G06F 11/0781; G06F 11/079; G06F 11/0793; G06F 11/1402
See application file for complete search history.

(56) References Cited

U.S. PATENT DOCUMENTS

| | | | |
|---|---|---|---|
| 4,995,035 A | 2/1991 | Cole et al. | |
| 5,005,122 A | 4/1991 | Griffin et al. | |
| 5,062,104 A | 10/1991 | Lubarsky et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A | 5/1994 | Heddes et al. | |
| 5,321,816 A | 6/1994 | Rogan et al. | |
| 5,333,315 A | 7/1994 | Saether et al. | |
| 5,347,653 A | 9/1994 | Flynn et al. | |
| 5,388,243 A | 2/1995 | Glider et al. | |
| 5,410,700 A | 4/1995 | Fecteau et al. | |
| 5,414,494 A * | 5/1995 | Aikens ................ G06F 11/2294 | |
| | | | 399/21 |
| 5,448,724 A | 9/1995 | Hayashi et al. | |
| 5,465,359 A | 11/1995 | Allen et al. | |
| 5,487,160 A | 1/1996 | Bemis | |
| 5,491,810 A | 2/1996 | Allen | |
| 5,495,607 A | 2/1996 | Pisello et al. | |
| 5,504,873 A | 4/1996 | Martin et al. | |
| 5,515,502 A | 5/1996 | Wood | |
| 5,544,345 A | 8/1996 | Carpenter et al. | |
| 5,544,347 A | 8/1996 | Yanai et al. | |
| 5,555,404 A | 9/1996 | Torbjornsen et al. | |
| 5,559,957 A | 9/1996 | Balk | |
| 5,559,991 A | 9/1996 | Kanfi | |
| 5,592,618 A | 1/1997 | Micka et al. | |
| 5,598,546 A | 1/1997 | Blomgren | |
| 5,606,359 A | 2/1997 | Youden et al. | |
| 5,615,392 A | 3/1997 | Harrison et al. | |
| 5,619,644 A | 4/1997 | Crockett et al. | |
| 5,638,509 A | 6/1997 | Dunphy et al. | |
| 5,642,496 A | 6/1997 | Kanfi | |
| 5,673,381 A | 9/1997 | Huai et al. | |
| 5,675,511 A | 10/1997 | Prasad et al. | |
| 5,680,550 A | 10/1997 | Kuszmaul et al. | |
| 5,682,513 A | 10/1997 | Candelaria et al. | |
| 5,687,343 A | 11/1997 | Fecteau et al. | |
| 5,699,361 A | 12/1997 | Ding et al. | |
| 5,719,786 A | 2/1998 | Nelson et al. | |
| 5,737,747 A | 4/1998 | Vishlitsky et al. | |
| 5,751,997 A | 5/1998 | Kullick et al. | |
| 5,758,359 A | 5/1998 | Saxon | |
| 5,761,677 A | 6/1998 | Senator et al. | |
| 5,761,734 A | 6/1998 | Pfeffer et al. | |
| 5,764,972 A | 6/1998 | Crouse et al. | |
| 5,778,395 A | 7/1998 | Whiting et al. | |
| 5,790,828 A | 8/1998 | Jost | |
| 5,805,920 A | 9/1998 | Sprenkle et al. | |
| 5,812,398 A | 9/1998 | Nielsen | |
| 5,813,008 A | 9/1998 | Benson et al. | |
| 5,813,009 A | 9/1998 | Johnson et al. | |
| 5,813,017 A | 9/1998 | Morris | |
| 5,829,023 A | 10/1998 | Bishop | |
| 5,829,046 A | 10/1998 | Tzelnic et al. | |
| 5,860,104 A | 1/1999 | Witt et al. | |
| 5,875,478 A | 2/1999 | Blumenau | |
| 5,875,481 A | 2/1999 | Ashton et al. | |
| 5,887,134 A | 3/1999 | Ebrahim | |
| 5,890,159 A | 3/1999 | Sealby et al. | |
| 5,897,643 A | 4/1999 | Matsumoto | |
| 5,901,327 A | 5/1999 | Ofek | |
| 5,924,102 A | 7/1999 | Perks | |
| 5,926,836 A | 7/1999 | Blumenau | |
| 5,933,104 A | 8/1999 | Kimura | |
| 5,950,205 A | 9/1999 | Aviani, Jr. | |
| 5,956,519 A | 9/1999 | Wise et al. | |
| 5,958,005 A | 9/1999 | Thorne et al. | |
| 5,970,233 A | 10/1999 | Liu et al. | |
| 5,970,255 A | 10/1999 | Tran et al. | |
| 5,974,563 A | 10/1999 | Beeler, Jr. | |
| 5,987,478 A | 11/1999 | See et al. | |
| 5,995,091 A | 11/1999 | Near et al. | |
| 5,999,629 A | 12/1999 | Heer et al. | |
| 6,003,089 A | 12/1999 | Shaffer et al. | |
| 6,009,274 A | 12/1999 | Fletcher et al. | |
| 6,012,090 A | 1/2000 | Chung et al. | |
| 6,021,415 A | 2/2000 | Cannon et al. | |
| 6,026,414 A | 2/2000 | Anglin | |
| 6,041,334 A | 3/2000 | Cannon | |
| 6,052,735 A | 4/2000 | Ulrich et al. | |
| 6,058,494 A * | 5/2000 | Gold ................... G06F 11/073 | |
| | | | 714/42 |
| 6,076,148 A | 6/2000 | Kedem et al. | |
| 6,094,416 A | 7/2000 | Ying | |
| 6,094,684 A | 7/2000 | Pallmann | |
| 6,105,129 A | 8/2000 | Meier et al. | |
| 6,105,150 A | 8/2000 | Noguchi et al. | |
| 6,112,239 A | 8/2000 | Kenner et al. | |
| 6,122,668 A | 9/2000 | Teng et al. | |
| 6,131,095 A | 10/2000 | Low et al. | |
| 6,131,190 A | 10/2000 | Sidwell | |
| 6,137,864 A | 10/2000 | Yaker | |
| 6,148,412 A | 11/2000 | Cannon et al. | |

(56) References Cited

U.S. PATENT DOCUMENTS

| | | |
|---|---|---|
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,266 B1 | 4/2002 | Shnelvar |
| 6,374,336 B1 | 4/2002 | Peters et al. |
| 6,381,331 B1 | 4/2002 | Kato |
| 6,385,673 B1 | 5/2002 | DeMoney |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,586 B1 | 8/2002 | Hass et al. |
| 6,446,224 B1 | 9/2002 | Chang et al. |
| 6,487,561 B1 | 11/2002 | Ofek et al. |
| 6,487,644 B1 | 11/2002 | Huebsch et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,571,310 B1 | 5/2003 | Ottesen |
| 6,577,734 B1 | 6/2003 | Etzel et al. |
| 6,581,143 B2 | 6/2003 | Gagne et al. |
| 6,604,149 B1 | 8/2003 | Deo et al. |
| 6,622,264 B1 | 9/2003 | Bliley et al. |
| 6,631,442 B1 | 10/2003 | Blumenau |
| 6,631,493 B2 | 10/2003 | Ottesen et al. |
| 6,647,396 B2 | 11/2003 | Parnell et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,675,177 B1 | 1/2004 | Webb |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,763,351 B1 | 7/2004 | Subramaniam et al. |
| 6,772,332 B1 | 8/2004 | Boebert et al. |
| 6,785,786 B1 | 8/2004 | Gold et al. |
| 6,789,161 B1 | 9/2004 | Blendermann et al. |
| 6,791,910 B1 | 9/2004 | James et al. |
| 6,859,758 B1 | 2/2005 | Prabhakaran et al. |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,909,722 B1 | 6/2005 | Li |
| 6,928,513 B2 | 8/2005 | Lubbers et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,039,810 B1 | 5/2006 | Nichols |
| 7,062,761 B2 | 6/2006 | Slavin et al. |
| 7,069,380 B2 | 6/2006 | Ogawa et al. |
| 7,080,141 B1 * | 7/2006 | Baekelmans ........ G06F 11/0709 709/202 |
| 7,085,904 B2 | 8/2006 | Mizuno et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,174,433 B2 | 2/2007 | Kottomtharayil et al. |
| 7,209,972 B1 | 4/2007 | Ignatius et al. |
| 7,237,232 B2 | 6/2007 | Smith |
| 7,243,230 B2 * | 7/2007 | England ................ G06F 21/57 713/168 |
| 7,246,140 B2 | 7/2007 | Therrien et al. |
| 7,246,207 B2 | 7/2007 | Kottomtharayil et al. |
| 7,246,272 B2 | 7/2007 | Cabezas et al. |
| 7,257,743 B2 | 8/2007 | Glerum et al. |
| 7,269,612 B2 | 9/2007 | Devarakonda et al. |
| 7,272,606 B2 | 9/2007 | Borthakur et al. |
| 7,277,941 B2 | 10/2007 | Ignatius et al. |
| 7,278,142 B2 | 10/2007 | Bandhole et al. |
| 7,284,165 B2 | 10/2007 | Auvenshine et al. |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,298,846 B2 | 11/2007 | Bacon et al. |
| 7,302,618 B1 | 11/2007 | Shafer et al. |
| 7,315,923 B2 | 1/2008 | Retnamma et al. |
| 7,340,649 B2 | 3/2008 | Angamuthu et al. |
| 7,346,623 B2 | 3/2008 | Prahlad et al. |
| 7,359,917 B2 | 4/2008 | Winter et al. |
| 7,380,072 B2 | 5/2008 | Kottomtharayil et al. |
| 7,398,429 B2 * | 7/2008 | Shaffer ............... G06F 11/3636 714/20 |
| 7,401,154 B2 | 7/2008 | Ignatius et al. |
| 7,409,509 B2 | 8/2008 | Devassy et al. |
| 7,448,079 B2 | 11/2008 | Tremain |
| 7,454,569 B2 | 11/2008 | Kavuri et al. |
| 7,457,933 B2 | 11/2008 | Pferdekaemper et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,500,150 B2 | 3/2009 | Sharma et al. |
| 7,509,019 B2 | 3/2009 | Kaku |
| 7,519,726 B2 | 4/2009 | Palliyll et al. |
| 7,523,483 B2 | 4/2009 | Dogan |
| 7,529,748 B2 | 5/2009 | Wen et al. |
| 7,529,976 B2 | 5/2009 | Beard et al. |
| 7,536,291 B1 | 5/2009 | Retnamma et al. |
| 7,546,324 B2 | 6/2009 | Prahlad et al. |
| 7,546,482 B2 | 6/2009 | Blumenau et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 7,631,194 B2 | 12/2009 | Wahlert et al. |
| 7,653,633 B2 | 1/2010 | Villella et al. |
| 7,685,126 B2 | 3/2010 | Patel et al. |
| 7,765,369 B1 | 7/2010 | Prahlad et al. |
| 7,809,914 B2 | 10/2010 | Kottomtharayil et al. |
| 7,831,553 B2 | 11/2010 | Prahlad et al. |
| 7,840,537 B2 | 11/2010 | Gokhale et al. |
| 7,840,809 B2 | 11/2010 | Bell |
| 7,861,050 B2 | 12/2010 | Retnamma et al. |
| 7,870,355 B2 | 1/2011 | Erofeev |
| 7,962,642 B2 | 6/2011 | Ignatius et al. |
| 7,975,061 B1 | 7/2011 | Gokhale et al. |
| 8,166,263 B2 | 4/2012 | Prahlad |

(56) References Cited

U.S. PATENT DOCUMENTS

| | | | |
|---|---|---|---|
| 8,219,524 | B2 | 7/2012 | Gokhale |
| 8,312,323 | B2* | 11/2012 | Gokhale ............. G06F 11/0751 |
| | | | 714/31 |
| 8,539,253 | B2 | 9/2013 | Sobel et al. |
| 8,650,445 | B2* | 2/2014 | Gokhale ............. G06F 11/0709 |
| | | | 714/57 |
| 9,122,600 | B2* | 9/2015 | Gokhale ............. G06F 11/0769 |
| 10,671,472 | B2* | 6/2020 | Gokhale ............... G06F 16/214 |
| 2001/0028473 | A1* | 10/2001 | Yamasaki ............ G06F 11/3068 |
| | | | 358/1.15 |
| 2001/0034812 | A1 | 10/2001 | Ignatius et al. |
| 2002/0004883 | A1 | 1/2002 | Nguyen et al. |
| 2002/0029281 | A1 | 3/2002 | Zeidner et al. |
| 2002/0040405 | A1 | 4/2002 | Gold |
| 2002/0042869 | A1 | 4/2002 | Tate et al. |
| 2002/0042882 | A1 | 4/2002 | Dervan et al. |
| 2002/0049778 | A1 | 4/2002 | Bell et al. |
| 2002/0069369 | A1 | 6/2002 | Tremain |
| 2002/0107877 | A1 | 8/2002 | Whiting et al. |
| 2002/0129203 | A1 | 9/2002 | Gagne et al. |
| 2002/0133755 | A1* | 9/2002 | Lopke ................. G06F 11/0769 |
| | | | 714/43 |
| 2002/0188691 | A1 | 12/2002 | Ignatius et al. |
| 2002/0194340 | A1 | 12/2002 | Ebstyne et al. |
| 2002/0198983 | A1 | 12/2002 | Ullmann et al. |
| 2003/0014607 | A1 | 1/2003 | Slavin et al. |
| 2003/0016609 | A1 | 1/2003 | Rushton et al. |
| 2003/0014433 | A1 | 3/2003 | Teloh et al. |
| 2003/0051097 | A1 | 3/2003 | Ottesen et al. |
| 2003/0061491 | A1 | 3/2003 | Jaskiewicz et al. |
| 2003/0169733 | A1 | 9/2003 | Gurkowski et al. |
| 2004/0073716 | A1 | 4/2004 | Boom et al. |
| 2004/0088432 | A1 | 5/2004 | Hubbard et al. |
| 2004/0107199 | A1 | 6/2004 | Dairymple et al. |
| 2004/0193953 | A1 | 9/2004 | Callahan et al. |
| 2004/0210796 | A1 | 10/2004 | Largman et al. |
| 2004/0230829 | A1 | 11/2004 | Dogan et al. |
| 2005/0033756 | A1 | 2/2005 | Kottomtharayil et al. |
| 2005/0086443 | A1 | 4/2005 | Mizuno et al. |
| 2005/0114406 | A1 | 5/2005 | Borthakur et al. |
| 2005/0114477 | A1 | 5/2005 | Willging et al. |
| 2005/0144520 | A1 | 6/2005 | Tuma et al. |
| 2005/0166011 | A1 | 7/2005 | Burnett et al. |
| 2005/0172093 | A1 | 8/2005 | Jain |
| 2005/0246510 | A1 | 11/2005 | Retnamma et al. |
| 2005/0246568 | A1 | 11/2005 | Davies |
| 2005/0256972 | A1 | 11/2005 | Cochran et al. |
| 2005/0262296 | A1 | 11/2005 | Peake |
| 2005/0268068 | A1 | 12/2005 | Ignatius et al. |
| 2006/0005048 | A1 | 1/2006 | Osaki et al. |
| 2006/0010227 | A1 | 1/2006 | Atluri |
| 2006/0044674 | A1 | 3/2006 | Martin et al. |
| 2006/0149889 | A1 | 7/2006 | Sikha |
| 2006/0152754 | A1* | 7/2006 | Boyd ................. G06F 11/0733 |
| | | | 358/1.15 |
| 2006/0224846 | A1 | 10/2006 | Amarendran et al. |
| 2006/0230244 | A1 | 10/2006 | Amarendran et al. |
| 2006/0294431 | A1 | 12/2006 | Bader et al. |
| 2007/0183224 | A1 | 8/2007 | Erofeev |
| 2007/0186042 | A1 | 8/2007 | Kottomtharayil et al. |
| 2007/0264956 | A1* | 11/2007 | Bicker ................... G06Q 10/10 |
| | | | 455/186.1 |
| 2007/0288536 | A1 | 12/2007 | Sen et al. |
| 2008/0059515 | A1 | 3/2008 | Fulton |
| 2008/0091894 | A1 | 4/2008 | Retnamma et al. |
| 2008/0229037 | A1 | 9/2008 | Bunte et al. |
| 2008/0243914 | A1 | 10/2008 | Prahlad et al. |
| 2008/0243957 | A1 | 10/2008 | Prahlad et al. |
| 2008/0243958 | A1 | 10/2008 | Prahlad et al. |
| 2008/0256173 | A1 | 10/2008 | Ignatius et al. |
| 2009/0138763 | A1 | 5/2009 | Arnold |
| 2009/0319534 | A1 | 12/2009 | Gokhale |
| 2010/0131461 | A1 | 5/2010 | Prahlad et al. |
| 2010/0131467 | A1 | 5/2010 | Prahlad et al. |
| 2016/0041867 | A1 | 2/2016 | Gokhale et al. |
| 2018/0089018 | A1 | 3/2018 | Gokhale et al. |
| 2020/0264947 | A1 | 8/2020 | Gokhale et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1115064 | 12/2004 |
| GB | 2366048 | 2/2002 |
| WO | WO 1995/013580 | 5/1995 |
| WO | WO 1998/039707 | 9/1998 |
| WO | WO 1998/039709 | 9/1998 |
| WO | WO 1999/012098 | 3/1999 |
| WO | WO 1999/014692 | 3/1999 |
| WO | WO 1999/017204 | 4/1999 |
| WO | WO 2004/090788 | 10/2004 |
| WO | WO 2005/055093 | 6/2005 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Commvault Systems, Inc., Continuous Data Replicator 7.0, Product Data Sheet, 2007.

Eitel, "Backup and Storage Management in Distributed Heterogeneous Environments," IEEE, 1994, pp. 124-126.

Farley, "Building Storage Networks," pp. 328-331, Osborne/McGraw-Hill, 2000.

Gait, "The Optical File Cabinet: A Random-Access File system for Write-Once Optical Disks," IEEE Computer, vol. 21, No. 6, pp. 11-22 (1988).

Gibson, "Network Attached Storage Architecture," pp. 37-45, ACM, Nov. 2000.

http://en.wikipedia.org/wiki/Naive_Bayes_classifier, printed on Jun. 1, 2010, in 7 pages.

Jander, "Launching Storage-Area Net," Data Communications, US, McGraw Hill, NY, vol. 27, No. 4(Mar. 21, 1998), pp. 64-72.

Recycle Bin (Windows), Aug. 2007, Wikipedia, pp. 1-3.

Gokhale, et al., U.S. Appl. No. 11/615,512 Published as 2008/0155091 A1 Abandoned, filed Dec. 22, 2006, Remote Monitoring in a Computer Network.

Gokhale, et al., U.S. Appl. No. 11/963,732 Published as 2009/0164853 A1 U.S. Pat. No. 8,312,323, filed Dec. 21, 2007, Systems and Methods for Remote Monitoring in a Computer Network and Reporting a Failed Migration Operation Without Accessing the Data Being Moved.

Gokhale, et al., U.S. Appl. No. 13/615,231 Published as 2013/0013967 A1 U.S. Pat. No. 8,650,445, filed Sep. 13, 2012, Systems and Methods for Remote Monitoring in a Computer Network.

Gokhale, et al., U.S. Appl. No. 14/139,241 Published as 2014/0195863 A1 U.S. Pat. No. 9,122,600, filed Dec. 23, 2013, Systems and Methods for Remote Monitoring in a Computer Network.

Gokhale, et al., U.S. Appl. No. 14/826,958 Published as 2016/0041867 A1 Abandoned, filed Aug. 14, 2015, Systems and Methods for Remote Monitoring in a Computer Network.

(56) References Cited

OTHER PUBLICATIONS

Gokhale, et al., U.S. Appl. No. 15/685,958 Published as 2018/0089018 A1 U.S. Pat. No. 10,671,472, filed Aug. 24, 2017, Systems and Methods for Remote Monitoring in a Computer Network.
Gokhale, et al., U.S. Appl. No. 16/857,012 Published as 2020/0264947 A1, filed Apr. 23, 2020, Remote Monitoring and Error Correcting Within a Data Storage System.

* cited by examiner

REMOTE MONITORING AND ERROR CORRECTING WITHIN A DATA STORAGE SYSTEM

RELATED APPLICATIONS

Any and all applications for which a foreign or domestic priority claim is identified in the Application Data Sheet, or any correction thereto, are hereby incorporated by reference into this application under 37 CFR 1.57

FIELD OF THE INVENTION

Embodiments of the invention relate to problem reporting in a computer network and, in particular, pertain to remote monitoring of a data storage system.

DESCRIPTION OF THE RELATED ART

Data migration systems are routinely utilized in computer networks to perform data migration operations on electronic data stored within a network. In general, primary data, comprising a production copy or other "live" version in a native format, is generally stored in local memory or another high-speed storage device that allows for relatively fast access. Such primary data is generally intended for short term retention, on the order of hours or days. After this retention period, some or all of the data is stored as one or more secondary copies, for example, to prevent loss of data in the event that a problem occurs with the data stored in primary storage.

Secondary copies are generally intended for longer-term storage, on the order of weeks to years, prior to being moved to other storage or discarded. Secondary copies may be indexed so that a user may browse and restore the data at a later point in time. In some embodiments, application data moves from more expensive, quick access storage to less expensive, slower access storage, over its lifetime.

While data migration systems function to preserve data in the event of a problem with the computer network, the data migration systems themselves may encounter difficulties in storing data. For this reason, human monitors may be used to observe the data migration system and intervene to resolve problems that arise. Often, these monitors are experts, employed by the provider of the data migration system, conversant in the operation of the data migration system and capable of gathering information from the system, diagnosing problems, and implementing solutions.

This conventional monitoring is problematic, though. In one aspect, problem resolution requires laborious, manual gathering of information necessary to diagnose and troubleshoot problems, increasing the time and cost associated with problem resolution. This information gathering is also complicated by the fact that much of the information gathered is often for points in time that are not required for problem resolution.

In another aspect, the monitors of the data migration system are typically employees of the data migration system provider, located remotely from the system, rather than locally based employees of the owner of the data migration system. The remote monitors therefore, must remotely access the network in order to gather information for problem resolution. Security measures against unauthorized intrusion, such as firewalls and other technologies, though, restrict remote access privileges to the data migration system. Lowering or reducing these defenses to allow remote monitors the access necessary to gather troubleshooting information may compromise the security of the data migration system and the computer network it serves.

It is also undesirable to allow individuals who are not employed and supervised by the owner of the data migration system access to the archived data within the data migration system. For example, a medical or financial institution may possess confidential information about its clients that, if accessed by unauthorized individuals, even inadvertently, may open the institution to significant liability. Conversely, however, without sufficient access privileges, the monitors' ability to obtain the information required for problem resolution is limited, prolonging the time required to resolve problems as a result.

SUMMARY OF THE INVENTION

The aforementioned deficiencies in the current monitoring of data migration systems illustrate the need for improved systems and methods for storage monitoring, in particular remote monitoring, and other improvements. In certain embodiments, one of more of these needs is satisfied by the automated problem reporting system and methods disclosed herein. In one embodiment, the invention provides a method of problem reporting in a computer network, such as a tiered data storage network. The method comprises monitoring a plurality of elements that perform data migration operations, detecting a problem that occurs during the data migration operation, requesting information from the elements, assembling the requested information into a report; and providing the report to a monitor (e.g., a human monitor) that does not possess access privileges to the elements.

In another embodiment, the invention provides a method of remotely monitoring the data migration operations within a computer network. The method comprises providing a plurality of elements, comprising at least one of hardware, software, and firmware components that perform data migration operations. The method also comprises monitoring at least one of log files generated by the elements, communications links between the elements, and configurations of the elements during the data migration operations to detect errors in the data migration operations. The method further comprises gathering and analyzing selected information from the monitored elements automatically in response to the detection of an error in a data migration operation. The method additionally comprises communicating the selected information to a remote monitor.

In a further embodiment, the invention provides a system for remote monitoring of a data migration operation occurring within a computer network. The system comprises a plurality of elements that perform data migration operations and a monitor agent which communicates with the elements to detect problems occurring within data migration operations. The monitor agent gathers information from the elements in response to a detected problem, where at least a portion of the gathered information is provided to a remote monitor that does not possess access privileges to the elements.

In an additional embodiment, the invention provides an automated problem reporting data migration system. The system comprises a client computer containing data, a plurality of storage media for storing the data, a storage manager which coordinates data migration between any of the client computers and storage media, a media agent which performs data migration operations in response to instructions from the storage manager, a monitor agent which monitors data migration operations and communicates errors occurring during data migration; and a remote listener which receives the errors communicated by the monitor agent and generates reports containing selected information regarding at least one of the system hardware, software, and firmware. The reports are provided to a remote monitor which does not possess access privileges to the data migration system.

BRIEF DESCRIPTION OF THE DRAWINGS

These and other objects and advantages will become more apparent from the following description taken in conjunction with the accompanying drawings.

DETAILED DESCRIPTION OF THE PREFERRED EMBODIMENTS

Embodiments of the present invention relate to systems and methods of automated, remote monitoring, problem reporting, and problem resolution in data migration systems for use with a computer network. However, embodiments of the invention can be applied to monitoring, problem reporting, and problem resolution in any suitable network environment, whether the monitor is remotely or locally based. Examples include, but are not limited to, monitoring of network communication failures and hardware, software, and firmware failures.

In one embodiment, data migration systems include combinations of hardware, software, and firmware programs, as well communications links, necessary for performing data migration operations on electronic data within a computer network. Certain embodiments of a data migration system are provided in U.S. patent application Ser. No. 11/120,619, entitled "HIERARCHICAL SYSTEMS AND METHODS FOR PROVIDING A UNIFIED VIEW OF STORAGE INFORMATION", which is incorporated herein by reference in its entirety.

Figure 1A:
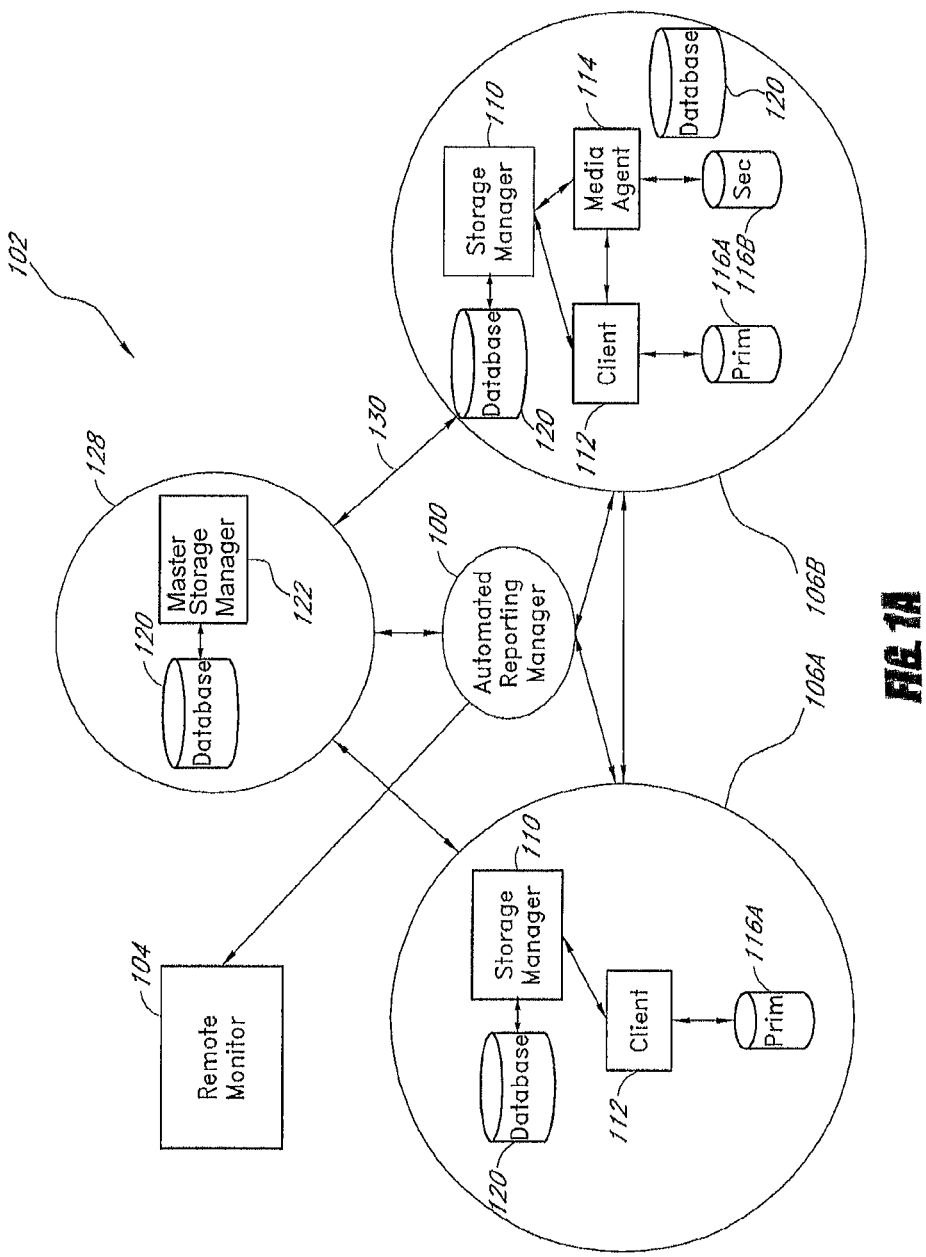
FIGS. 1A-1B are schematic illustrations of embodiments of a data migration system with automated problem reporting capability.

FIG. 1A illustrates one embodiment of a data migration system 102 with automated problem reporting capability for use in conjunction with a computer network. In one embodiment, the system 102 comprises a plurality of storage operation cells such as 106A, B (collectively, 106) and an automated reporting manager 100 which communicate through communication links 130. In general, the automated reporting manager 100 communicates with the cells 106 as they perform data migration operations. When the cells 106 detect a failure in one or more operations of a data migration process, an alert is issued to the reporting manager 100.

Based on the nature of the problem, the reporting manager 100 can determine which elements are involved in the failed data migration operation, where the elements may comprise hardware, software, or firmware components within the system 102. For example, the data migration of a Microsoft Exchange server can involve an Exchange server, a computer that manages the data migration hardware, and the reporting manager 100 itself. The reporting manager 100 may subsequently request information from these elements for analysis to ascertain the nature of the problem and extract of at least a portion of the received information pertinent to the failed process. Based on this pertinent information, the reporting manager 100 generates a report. Copies of the report are subsequently made available to a monitor 104, which in certain embodiments is a remote monitor 104.

Figure 1B:
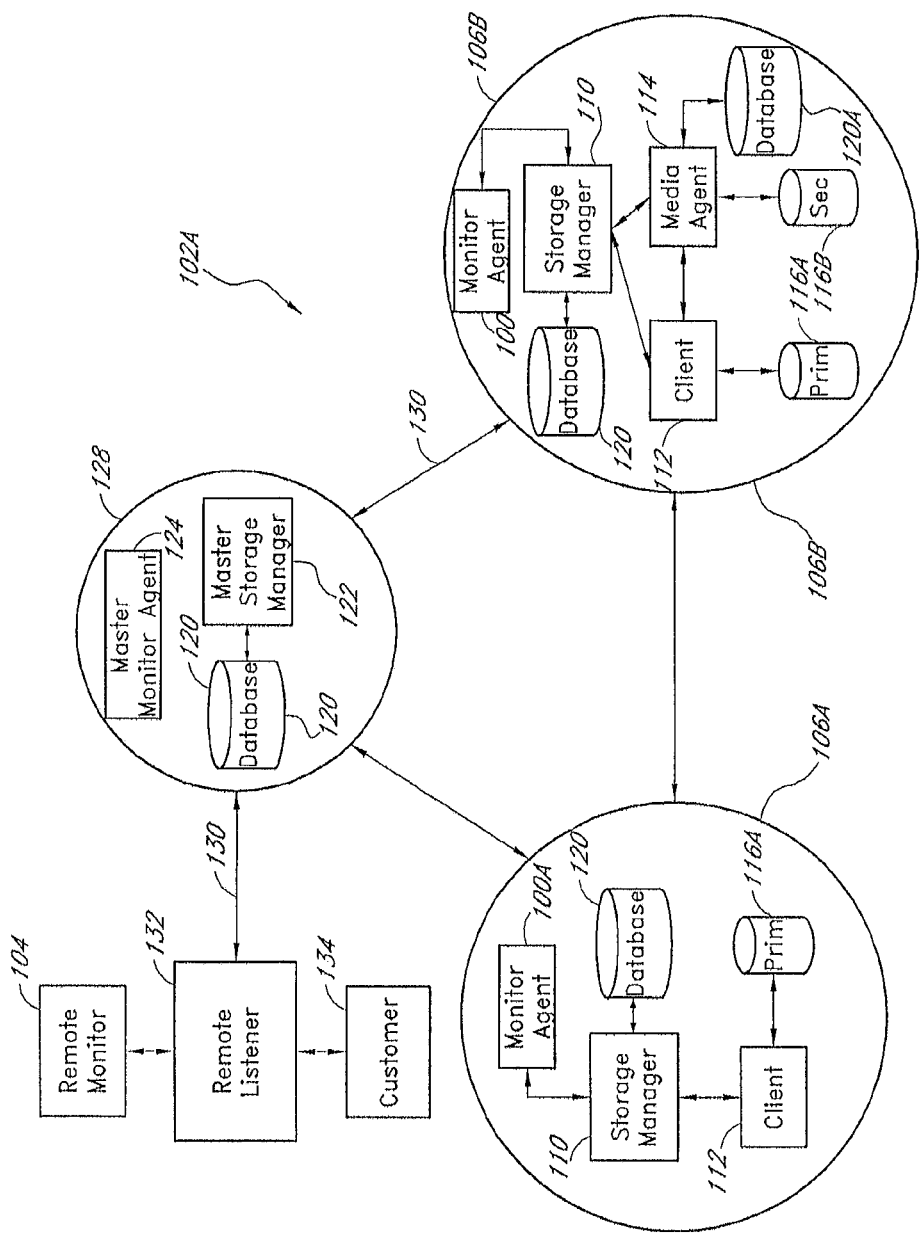

In an alternative embodiment, as illustrated in FIG. 1B, each of the cells of a data migration system 102A comprises a monitor agent 100A. When the cells 106 detect an error in one or more operations of a data migration process, an alert is issued to the monitor agent 100A. Upon receipt of the alert, the monitor agent 100A communicates with a remote listener 132, which automatically provides the monitor agent 100A with instructions as how to proceed. Depending on the nature of the alert, the remote listener 132 can further communicate the alert to at least one of a customer 134 and the monitor 104 or archive the alert.

Based upon the nature of the problem, the monitor agent 100A can be instructed by the remote listener 132 to gather information about the elements involved in the failed data migration process. The remote listener 132 receives the requested information from the monitor agent 100A for preparation of an error report. Copies of the report are subsequently made available, through an operational dashboard, to the remote monitor 104 and, optionally, the customer 134. In certain embodiments, the remote listener 132 may further analyze the error report prior to delivery to the remote monitor 104 and/or and customer 134 in order to ascertain the source of the error and possible solutions.

Beneficially, no intervention is required on the part of the remote monitor 104 or the administrator of the data migration systems 102, 102A (referred to herein as the customer administrator) in generation of the error report. In one aspect, this feature reduces the costs associated with problem resolution, as by automatically determining the information necessary for problem resolution, gathering the information, and analyzing the information, the systems 102, 102A perform tasks that would otherwise be performed by the monitor 104 and/or customer administrator. This allows problems to be identified and remedied more quickly than if the problems were manually identified, reducing downtime of the systems 102, 102A. Furthermore, a greater portion of the remote monitor's time may be spent developing solutions to problems, rather than gathering and analyzing the information. Additionally, by reducing the time necessary to identify and resolve problems, fewer monitors 104 may be necessary to support the systems 102, 102A, reducing support costs.

In another aspect, the automated reporting capability enhances the security of the data migration systems 102, 102A. As the systems 102, 102A provide the information necessary for troubleshooting, the monitor 104 is not required to access to the computer network or the data migration systems 102, 102A to obtain the information. This configuration significantly reduces the need for remote access to potentially sensitive information regarding the systems 102, 102A, reducing vulnerabilities that an unauthorized user may exploit to gain access to the systems 102, 102A. Furthermore, this setup ensures that the monitor 104 does not access the data stored within the computer network, preserving the confidentiality of the data stored within the systems 102, 102A.

In a further aspect of the systems 102, 102A, discussed in greater detail below, the customer administrator may select the information that is provided in the report to the monitor 104. Thus, information regarding selected elements, log files, configurations, and other information may be omitted from the report. As a result, the monitor 104 may be provided with limited information for initial problem solving and, at the administrator's discretion, provided additional information, as necessary.

Embodiments of the storage operation cells 106 of the systems 102, 102A are illustrated in FIGS. 1A-1B. The storage operation cells 106 may include combinations of hardware, software, and firmware elements associated with performing data migration operations on electronic data, including, but not limited to, creating, storing, retrieving, and migrating primary data copies and secondary data copies. One exemplary storage operation cell 106 may comprise CommCells, as embodied in the QNet storage management system and the SIMPANA storage management system by CommVault Systems, Inc., of Oceanport, N.J.

In one embodiment, the storage operation cells 106 may comprise a plurality of elements such as monitor agents 100, storage managers 110, client computers 112, media agents 114, and primary and secondary storage devices 116A, B (collectively, 116), as discussed in greater detail below. It should be understood that this list is not exhaustive and that the number of these and other elements present or absent within the cell 106 may be provided as necessary for the data migration operations performed by the cell 106. In some embodiments, certain elements reside and execute on the same computer, while in alternate embodiments, the some or all of the elements reside and execute on different computers.

The storage manager 110 comprises a software module or other application which coordinates and controls data migration operations performed by the storage operation cell 106. These operations may include, but are not limited to, initiation and management of production data copies, production data migrations, and production data recovery. To perform these operations, the storage manager 110 may communicate with some or all elements of the storage operation cell 106. The storage manager 110 may also maintain a database 120 or other data structure to indicate logical associations between elements of the cell 106, for example, the logical associations between media agents 114 and storage devices 116 as discussed below.

The monitor agent 100A comprises a software module or other application that is in communication with at least the storage manager 110 and a remote listener 132. The monitor agent 100A resides on the same device as the storage manager 110. As discussed in greater detail below, the monitor agent 100A is configured to receive alerts from the storage manager 110 regarding errors in data migration operations and communicate the alerts to the remote listener 132. The monitor agent 100A can comprise a passive agent and/or can further receive instructions from the remote listener 132, which the monitor agent 100A communicates to the storage manager 110 for implementation.

In one embodiment, the media agent 114 is an element that instructs a plurality of associated storage devices 116 to perform operations which subsequently archive, migrate, or restore data to or from the storage devices 116 as directed by the storage manager 110. For example, the media agent 114 can be implemented as a software module that conveys data, as directed by the storage manager 110, between a client computer 112 and one or more storage devices 116, such as a tape library, a magnetic media storage device, an optical media storage device, or other suitable storage device. In one embodiment, media agents 114 can be communicatively coupled with, and control, a storage device 116 associated with that particular media agent 114. A media agent 114 can be considered to be associated with a particular storage device 116 if that media agent 114 is capable of routing and storing data to that storage device 116.

In operation, the media agent 114 associated with a particular storage device 116 can instruct the storage device 116 to use a robotic arm or other retrieval mechanism to load or eject certain storage media, and to subsequently archive, migrate, or restore data to or from that media. Media agents 114 can communicate with a storage device 116 via a suitable communications link 130, such as a Small Computer System Interface (SCSI) or fiber channel communication.

The media agent 114 can also maintain an index cache, database, or other data structure 120, 120A that stores index data generated during data migration, migration, and restore and other data migration operations that can generate index data. The data structure 120, 120A provides the media agent 114 with a fast and efficient mechanism for locating data stored or archived. Thus, in some embodiments, the storage manager database 120, 120A can store data that associates a client 112 with a particular media agent 114 or storage device 116. The database 120, 120A, associated with the media agent 114, can indicate specifically where client 112 data is stored in the storage device 116, what specific files are stored, and other information associated with the storage of client 112 data.

In one embodiment, a first storage operation cell 106A can be configured to perform a particular type of data migration operation, such as storage resource management operations (SRM). SRM can comprise operations include monitoring the health, status, and other information associates with primary copies of data (e.g., live or production line copies). Thus, for example, the storage operation cell 106A can monitor and perform SRM related calculations and operations associated with primary copy data. The first storage operation cell 106A can include a client computer 112 in communication with a primary storage device 116A for storing data directed by the storage manager 110 associated with the cell 106A.

For example, the client 112 can be directed using Microsoft Exchange data, SQL data, oracle data, or other types of production data used in business applications or other applications stored in the primary volume. The storage manager 110 can contain SRM modules or other logic directed to monitor or otherwise interacting with the attributes, characteristics, metrics, and other information associated with the data stored in the primary volume.

In another implementation, a storage operation cell 106B can also contain a media agent 114 and secondary storage volume 1168 configured to perform SRM related operations on primary copy data The storage manager 110 can also track and store information associated with primary copy migration. In some embodiments, the storage manager 110 can also track where primary copy information is stored, for example in secondary storage.

In alternative implementations, the storage operation cell 106B can be directed to another type of data migration operation, such as hierarchical storage management (HSM) data migration operations. For example, the HSM storage cell can perform production data migrations, snapshots or other types of HSM-related operations known in the art. For example, in some embodiments, data is migrated from faster and more expensive storage such as magnetic storage (i.e., primary storage) to less expensive storage such as tape storage (i.e., secondary storage).

The storage manager 110 can further monitor the status of some or all data migration operations previously performed, currently being performed, or scheduled to be performed by the storage operation cell 106. In one embodiment, the storage manager 110 can monitor the status of all jobs in the storage cells 106 under its control as well as the status of each component of the storage operation cells 106. The storage manager can monitor SRM or HSM operations as discussed above to track information which can include, but is not limited to: file type distribution, file size distribution, distribution of access/modification time, distribution by owner, capacity and asset reporting (by host, disk, or partition), availability of resources, disks, hosts, and applications. Thus, for example, the storage manager 110 can track the amount of available space, congestion, and other similar characteristics of data associated with the primary and secondary volumes 116A, B, and issue appropriate alerts to the reporting manager 100 or monitor agent 100A when a particular resource is unavailable or congested.

The storage manager 110 of a first storage cell 106A can also communicate with a storage manager 110 of another cell, such as 106B. In one example, a storage manager 110 in a first storage cell 106A communicates with a storage manager 110 in a second cell 106B to control the storage manager 110 of the second cell 106B. Alternatively, the storage manager 110 of the first cell 106A can bypass the storage manager 110 of the second cell 106B and directly control the elements of the second cell 106B.

In further embodiments, the storage operation cells 106 can be hierarchically organized such that hierarchically superior cells control or pass information hierarchically to subordinate cells and vice versa. In one embodiment, a master storage manager 122 can be associated with, communicate with, and direct data migration operations for a plurality of storage operation cells 106. In some embodiments, the master storage manager 122 can reside in its own storage operation cell 128. In other embodiments, the master storage manager 122 can itself be part of a storage operation cells 106.

In other embodiments, the master storage manager 122 can track the status of its associated storage operation cells 106, such as the status of jobs, system elements, system resources, and other items by communicating with its respect storage operation cells 106. Moreover, the master storage manager 122 can track the status of its associated storage operation cells 106 by receiving periodic status updates from the cells 106 regarding jobs, elements, system resources, and other items. For example, the master storage manager 122 can use methods to monitor network resources such as mapping network pathways and topologies to, among other things, physically monitor the data migration operations.

The master storage manager 122 can contain programming or other logic directed toward analyzing the storage patterns and resources of its associated storage cells 106. Thus, for example, the master storage manager 122 can monitor or otherwise keep track of the amount of resources available such as storage media in a particular group of cells 106. This allows the master storage manager 122 to determine when the level of available storage media, such as magnetic or optical media, falls below a selected level, so that an alert can be issued to the reporting manager 110 or monitor agent 100A, that additional media can be added or removed as necessary to maintain a desired level of service.

In one embodiment, the monitor agents 100A can also be hierarchically organized (FIG. 1B). For example, the monitor agents 100A of hierarchically lower cells, such as cells 106A, 106B, can be configured to communicate received alerts to monitor agents of hierarchically superior cells, up to a master monitor agent 124. The master monitor agent 124, in this configuration, is designed to communicate with the remote listener 132 to avoid sending multiple, redundant messages to the remote listener 132.

Figure 2:
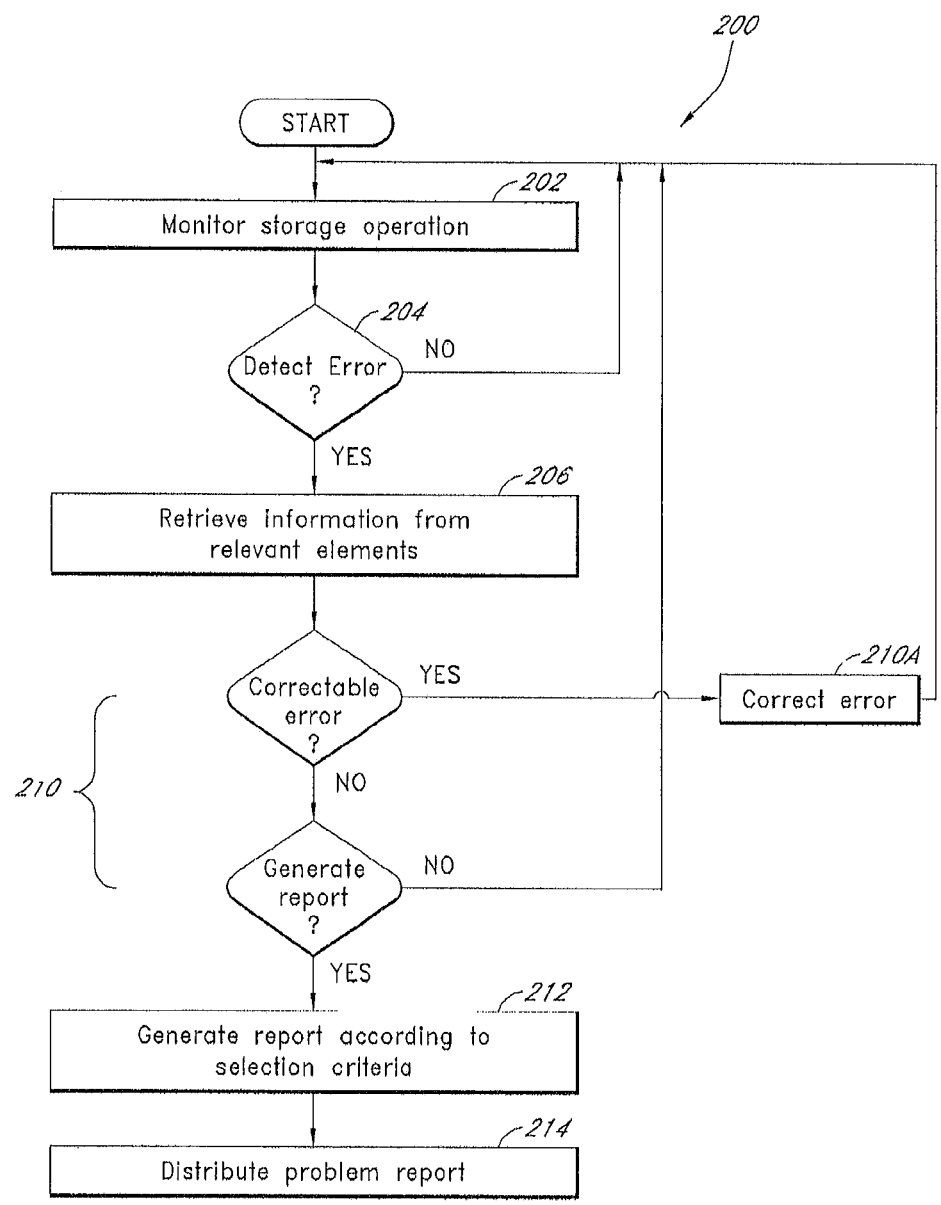
FIG. 2 is a flowchart illustrating one embodiment of a method of remote, automated problem reporting.

FIG. 2 illustrates embodiments of a method 200 of automated problem reporting. The method 200 may be employed in conjunction with either of the systems 102, 102A. At block 202, the reporting manager 100 or monitor agent 100A monitors a plurality of storage operations (e.g., data migration processes, backup processes, or the like) occurring within the cell. For exemplary purposes, the method 200 will be described with reference to a data migration process.

At block 204, the reporting manager 100 or monitor agent 100A detects at least one failure occurring in the data migration process. At block 206, information is requested and obtained pertaining to all elements involved in a failed data migration process. At block 210, the information is analyzed in order ascertain the nature of the problem. At block 212, the problem report is generated, based upon selection criteria provided by the customer administrator. At block 214, the problem report is disseminated to at least the remote monitor 104 and, optionally, the customer 134.

At block 202, the automated reporting manager 100 or monitor agent 100A monitors data migration operations performed within the entire system 102, 102A, as well as the status of the system elements. In one embodiment, this monitoring can comprise active monitoring, by the reporting manager 100, of data migration operations. These data migration operations may include, but are not limited to, SRM operations on primary copy information, HSM operations on secondary copy information, communication between storage cells 106 and, if hierarchically organized, between the cells 106 and the master storage manager 122. In an alternative embodiment, this monitoring may comprise the monitor agent 100A waiting to receive an alert generated during data migration operations.

An example data migration operation can be one performed according data migration protocols 304 (FIGS. 3A, 3B) specified by the customer administrator. These protocols 304 are maintained by the storage manager 110 and may specify when to perform data migration operations, which data is to be migrated, where the data is to be migrated, and how long data will be retained before deletion. For example, a protocol 304 can specify that selected data is to be retained in primary storage for a selected number of weeks from creation before migration to secondary storage, retained in secondary storage for a selected number of months before migrating to lower level storage 306, and retained in lower level storage for a selected number of years, at which point the data is deleted. Alternatively, the data migration operation can be performed in response to a request for archived information by the client 112. In either case, the data structure 120 maintains a record of the media agent 114 which is responsible for tracking the location of the data. At each stage in the data migration process, the elements can also generate logs 300 or log entries which maintain a record of the data migration and retrieval operations they perform.

Figure 3A:
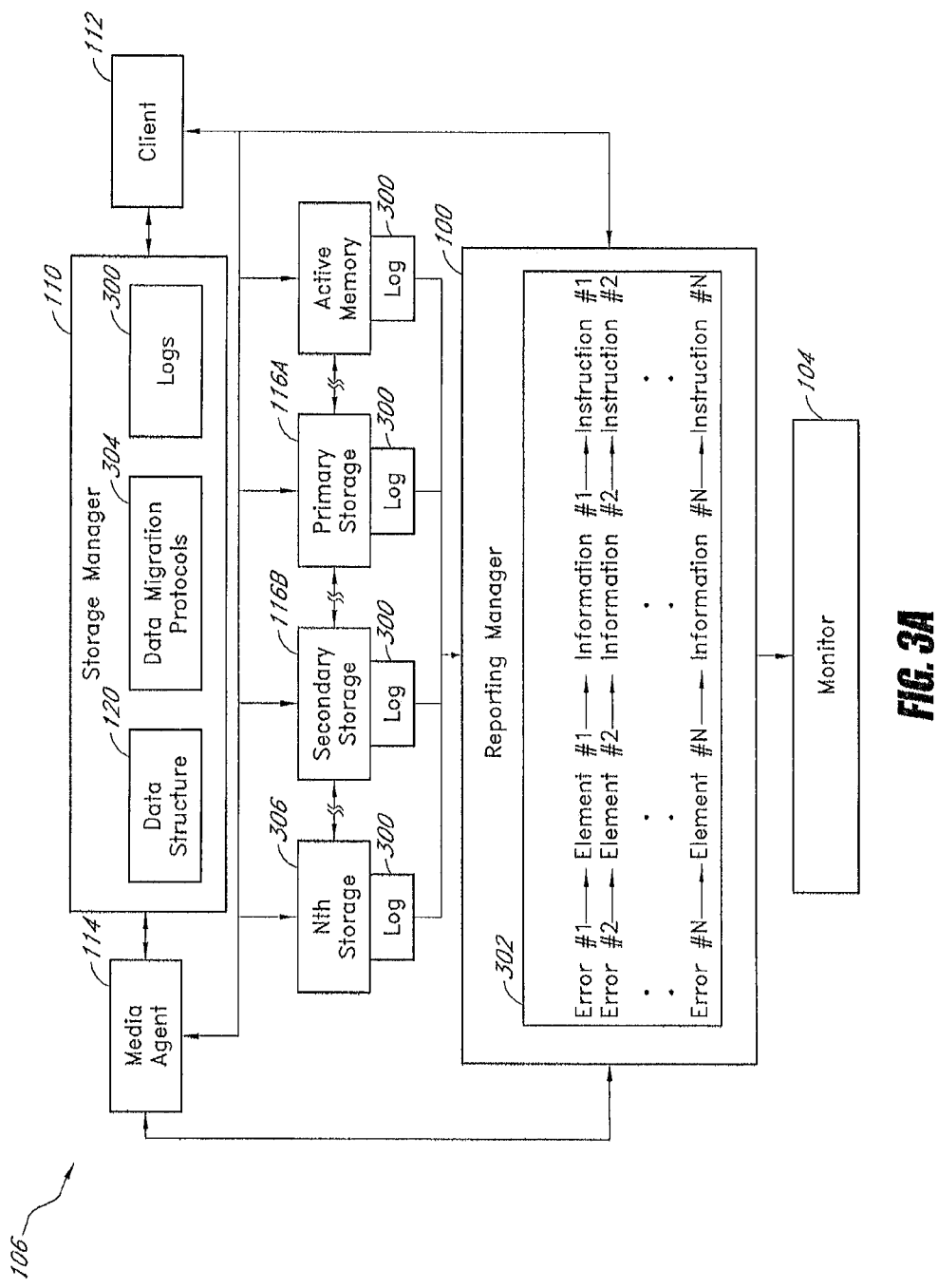
FIGS. 3A-3B are block diagrams illustrating monitoring, detection, resolution, and reporting processes within the systems of FIGS. 1A and 1B, respectively.

At block 204, the reporting manager 100 or monitor agent 100A detects an error which has previously occurred, is currently occurring, or is expected to occur in one or more data migration operations or elements of the system. In one embodiment, as depicted in FIG. 3A, the reporting manager 100 can communicate with any combination of elements of the system 102, such as storage managers 110, clients 112, media agents 114, storage devices 116, or data structures 120, as necessary. The elements of the system 102 are also provided with programming or other logic that returns an appropriate error when an operation fails to be properly performed. The reporting manager 100 can detect these errors by actively monitoring the logs 300 for errors. Alternatively, the errors can be communicated to the reporting manager 100 by any of the elements of the system 102, either singly or in combination. The reporting manager 100 can additionally monitor element hardware, software, and firmware status and configurations, as well communication links, to ascertain if communication errors, hardware, software, firmware, or configurations unrelated to the data migration operation, are responsible for errors.

Figure 3B:
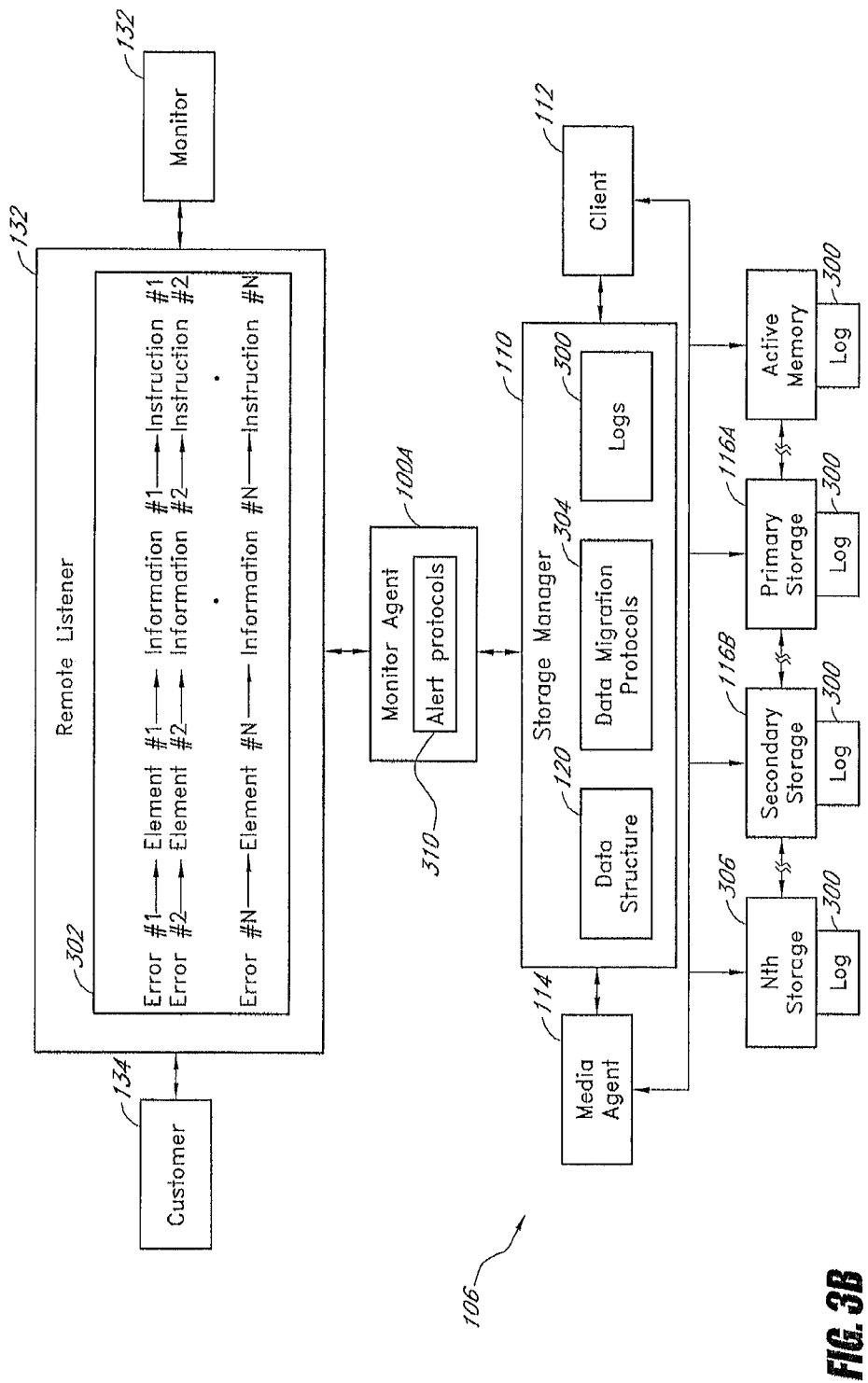

In an alternative embodiment, as depicted in FIG. 3B, the elements of the system 102A are provided with programming or other logic that returns an appropriate alert to the storage manager 110 when an operation fails to be properly performed or is anticipated to fail. Elements which return errors can include, but are not limited to, the monitor agent 100A itself, storage managers 110, clients 112, media agents 114, storage devices 116, data structures 120, or combinations thereof, as well as the hardware, software, and/or firmware of the cell elements and network communication devices. Upon receipt of the alert, the monitor agent 100A consults a database 310 comprising alert protocols, which informs the monitor agent 100A which alerts it is authorized to pass along to the remote listener 132.

At block 206, the reporting manager 100, or monitor agent 100A, gathers the relevant information from the elements upon detection of an error. In the embodiment of FIG. 3A, the reporting manager 110 utilizes a data structure 302 containing a lookup table that correlates the detected errors with the appropriate elements involved in the problem. The data structure 302 can further provide the reporting manager 110 with a list of the information that is to be gathered from the elements in conjunction with the error. In the embodiment of FIG. 3B, the remote listener 132 may maintain the data structure 302. Thus, when receiving an alert regarding an error from the monitor agent 100A, the remote listener 132 can provide the monitor agent 100A with instructions to gather and return information in accordance with the data structure 302.

At block 210, the reporting manager 100, or remote listener 132, determines whether a human actionable problem report should be generated. In certain embodiments, the reporting manager 100 or remote listener 132 can utilize programming or other logic to perform content-based analysis on the gathered information to make this determination. For example, the reporting manager 100 may retrieve logs 300 of the system elements for analysis, such as by parsing the logs 300, to determine the presence of selected key strings, such as error codes. In alternative embodiments of the system 102A, the remote listener 132 may instruct the monitor agent 100A to return this information for analysis. In either case, the data structure 302 can further comprise instructions regarding a course of action for each error. For example, the data structure 302 can provide instructions for the reporting manager 100 or remote listener 132. When detecting an error code in the logs 300, the reporting manager 100 or remote listener 132 can review the data structure 302 in light of the error codes to determine the appropriate course of action.

In one embodiment, the reporting manager 100 or remote listener 132 may determine that a problem report should not be generated. For example, the data structure 302 may indicate that the error is correctable by the system 102. In this case, the reporting manager 100 or monitor agent 100A can be instructed to ignore the error and return to monitoring the data migration process from block 202. Alternatively, the reporting manager 100, or the remote listener 132 via the monitor agent 100A, can provide the appropriate storage manager 110 with the instructions contained within the data structure 302 to resolve the problem.

In an alternative embodiment, the reporting manager 100, or the remote listener 132, can determine that a problem report should be generated upon consultation of the data structure 302. For example, the data structure 302 may indicate that an error may not be corrected by the system 102 at block 210A. In another example, the data structure 302 can indicate that a problem report should be generated when an error repeatedly occurs over a selected time window. Advantageously, in this manner, reports are generated on true failure problems that require the attention of the monitor 104, rather than routine errors that are readily resolved by the system 102 itself.

Use of the data structure 302 by the reporting manager 100 or remote listener 132 can also advantageously allow for the prioritization of reports. For instance, the data structure 302 can further contain a selected priority rating for each error it contains. For example, serious errors can be assigned a high priority and trivial errors can be assigned a low priority. Thus, when the monitor 104 receives a report, the report can be sorted into an ordered queue for resolution based on its priority. Beneficially, this priority rating ensures that the most serious reported problems are highlighted for attention, based on their severity, and not ignored during the resolution of less severe problems.

At block 212 of the method 200, the report can be generated according to selection criteria provided by the customer administrator. As discussed in greater detail below, the reporting manager 100 and remote listener 132 provide a graphical user interface, also referred to as a dashboard, which allows the customer administrator to select the portions of the collected information provided in the report. Filtering based upon a job ID, the relevant elements, and a selected time period, as well as element error logs, crash dumps, and configurations and other criteria may be utilized.

In one embodiment, the report comprises a plurality of files that provide the information selected by the customer administrator, as discussed below. In general, the report can comprise combinations of text files, xml, and html files, cabinet files, and other file types appropriate for providing the information requested by the reporting manager 100 or remote listener 132 in conjunction with problem resolution. Alternatively, the customer administrator can also initiate the generation of a problem report at his or her discretion.

In one embodiment, the report can contain a text file or other appropriate file which provides a summary of the collected information. The summary can include the job ID and failure reason of the failed process, if a job ID option is selected for reporting along with a subject, as discussed in greater detail below. The summary can additionally comprise the cell ID (such as a CommCell ID for a cell within the CommVault GALAXY system), element name, operating system, platform, time zone, version of the data migration system software, IP address, combinations of the same or the like.

Another portion of the report can comprise a collection of files pertaining to each client 112. In a non-limiting example, the files can include combinations of one or more of the following: data migration system logs (such as those provided by the CommVault GALAXY system), element hardware, software, and firmware configurations, system logs, crash dumps, and registries (such as those provided by the CommVault GALAXY system). In a preferred embodiment, the GALAXY registries are included by default, with other information provided optionally, at the administrator's discretion. In one embodiment, if the customer administrator selects to report the job ID or filter the information presented in the report by time, as discussed below, the reported log lines can be sent by the clients 112 to the reporting manager 100 or remote listener 132 in plain text, using encryption, such as through secure sockets, or combinations thereof. The received information can be combined into a single file for inclusion in the report. Optionally, a separate log file for each client 112 can be provided, rather than combined into a single file.

Another portion of the report can optionally comprise a fingerprint, in an xml format. The fingerprint provides a unique identifier that allows the system to distinguish between the machines that are being reported on. Any generally understood fingerprint technology can be utilized, including, but not limited to, the serial numbers of hardware or software present in the machines (e.g., CPU, hard disk drive, volume creation date, or operating system), addresses (e.g., MAC address of the network adapter of the machines, network address), or combinations thereof.

An additional component of the log bundle can optionally comprise database dumps. In general, a database dump contains a record of the table structure and/or the data from a database. In one embodiment, the database dump can be in the form of list of SQL queries. The database dump can be utilized in order to restore the contents of a database in the event of data loss. For example, corrupted databases can often be recovered by analysis of the dump.

A further component of the report can optionally comprise SQL_ERROR_LOGS.CAB, a cabinet file that contains all files with the name ERRORLOG.<NUM> as discussed above.

At block 214 of the method 200, the report is issued to the remote monitor 104 and, optionally, the customer 134. The remote monitor 104, in one embodiment, comprises a plurality of computer professionals capable of troubleshooting problems arising in the data migration system who reside in one or more locations removed from the physical location of the data migration system. As discussed in greater detail below in FIGS. 4 and 5A, the report can be provided to the monitor 104 through a variety of mechanisms, including upload to an ftp site, upload to a local directory, a plurality of e-mail messages, fax, and telephone messages, and the remote listener 132.

For example, in the case of a relatively minor problem, the report can be provided through electronic mechanisms, such as one or more of e-mail, ftp, local upload, and the remote listener 132. In the case of more severe problems, the report can be followed up by telephone messages. The monitor 104 can read at least a portion the report to ascertain the nature of the problems that triggered the report or utilize another program to analyze the report in part or in total. Upon ascertaining possible causes for the problems, appropriate actions can be suggested and/or implemented for problem resolution.

In one embodiment, the monitor 104 does not possess access privileges to the data migration system. The monitor 104 thus operates in a support capacity, analyzing the problem report and suggesting possible courses of action to those locally who possess access privileges and/or physical access to the system. Advantageously, this system design allows the customer administrator to employ the remote monitor 104 for support without compromising the security of the data migration system or computer network by allowing remote access. Furthermore, as discussed in greater detail below, the report does not contain any information on the data within the computer network, and the customer administrator can limit information the reporting manager 100 or monitor agent 100A provides regarding the data migration system 102 in the report, further enhancing the security of the system.

In an alternative embodiment, the monitor 104 can possess a selected level of remote access privileges to the data migration system. This access allows the monitor to use the report as a starting point for problem resolution, isolating possible causes, and allowing the monitor 104 to execute solutions remotely. Advantageously, this setup can be appropriate for systems requiring only low security. For example, in a small business without a local computer professional, the automated report could assist a remote monitor 104 in identifying problems that they could subsequently fix, without the need for the small business owner to contract for a local computer professional, reducing the cost of maintaining the data migration system.

Figure 4:
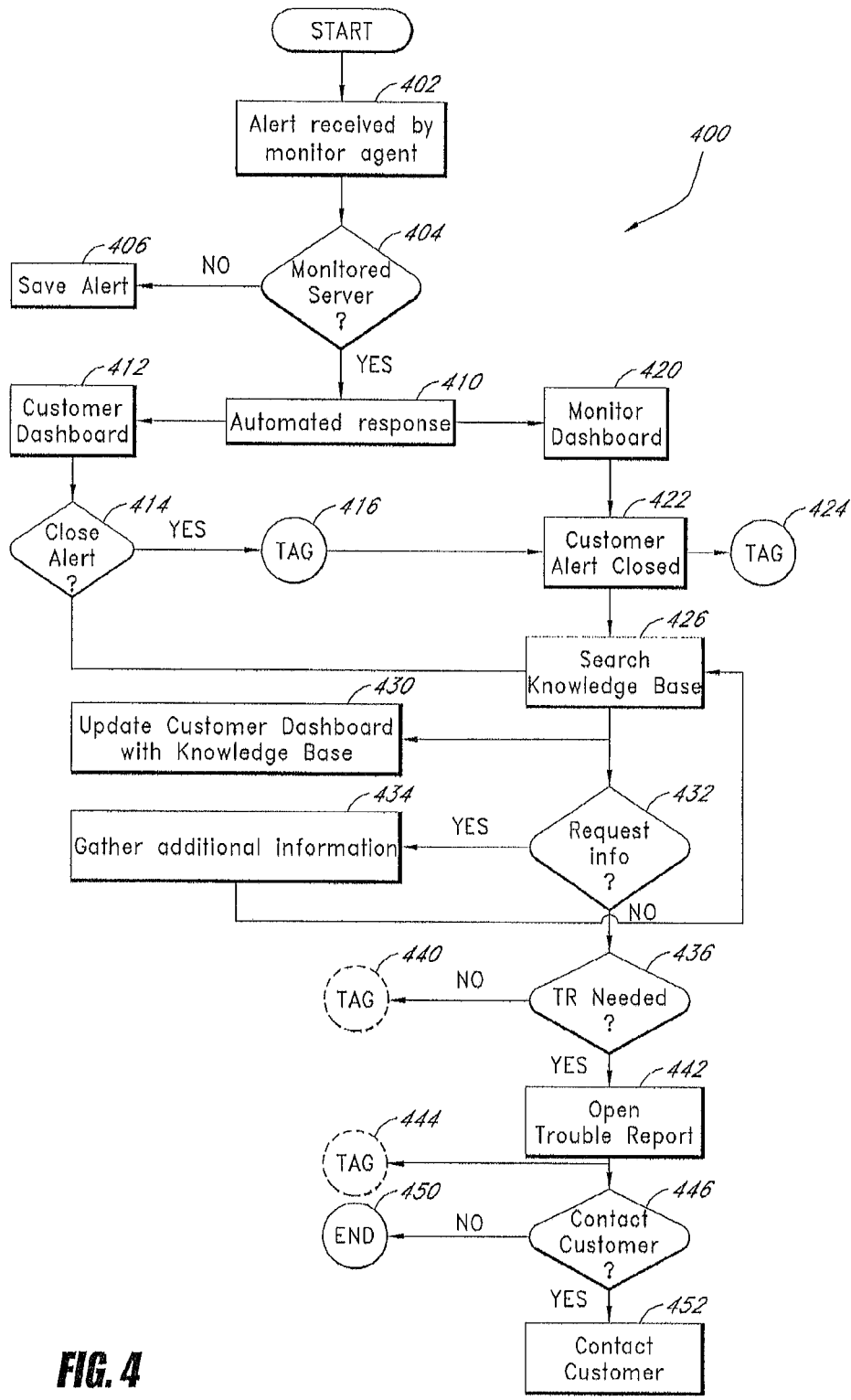
FIG. 4 is a workflow chart for one embodiment of the system of FIG. 1B.

FIG. 4 illustrates an exemplary embodiment of a workflow diagram 400 for problem detection and reporting using the system 102A in conjunction with the monitor agent 100A. The workflow begins at block 402 with receipt of an alert by the monitor agent 100A. As discussed above, the alert can be generated by any element of the system 102A and sent to the monitor agent 100A, where the monitor agent 100A determines whether to forward the alert to the remote listener 132 by consulting alert protocols 310 (FIG. 3B).

In one embodiment, the monitor agent 100A determines that the alert should not be passed along to the remote listener 132 (block 406). For example, the alert can comprise notification of a trivial error that is not harmful. In another example, the alert can comprise errors that the customer has specifically asked not to be notified of. In this event, the alert can be saved for archival purposes.

In another embodiment, the monitor agent 100A determines that the alert should be passed along to the remote listener 132 (block 410). The alert is passed to the remote listener 132 through a secure communications protocol. For example, the alert can be transmitted using a secure socket layer (SSL). Advantageously, the use of a secure communications protocol significantly reduces the likelihood of eavesdropping, tampering, and/or message forgery. The remote listener 132 determines the requirements to process the alert or to catalogue the alert as benign and not requiring additional activity.

Upon receipt of the alert, the remote listener 132 communicates the alert to the monitor 104 and, optionally, the customer 134. In one embodiment, the alert can be provided to respective graphical user interfaces, or dashboards, of the customer 134 (block 412) and/or monitor 104 (block 420). When received by the customer dashboard, the customer administrator can view and, optionally, act upon the alert (block 414). When received by the monitor dashboard, the alert begins an automated process of diagnosis and resolution, discussed in more detail below.

In one embodiment, the customer can close and/or tag the alert (blocks 414 and 416). For example, the alert can comprise a reoccurring problem already known to the customer administrator. Alternatively, the error can comprise an advisory alert that is not actionable by the customer administrator. Closure and/or tagging of an alert is subsequently communicated to the monitor 104 (block 422), which also tags the alert (block 424). Advantageously, this particular action "closes the loop" on communications with the customer, providing the monitor 104 with explicit confirmation that the customer administrator has received the alert.

Tagging is a workflow process associated with the triage and redress of the alert (block 424) dependent on the service level associated with the affected system. The customer is provided with the capability to tag an alert in the event that the alert is an anticipated event. For example, the customer might upgrade the firmware of a tape library and fail to suspend the data migration process, which would utilize this library during the time which the library is offline. The remote monitor 104 tags the alert (block 422) as part of the service workflow associated with the ROMS process.

In another embodiment, the customer 134 can choose not to close the alert, instead requesting more information on the alert. The customer dashboard can interface with a knowledge base maintained remote listener 132 for this purpose. In certain embodiments, the knowledge base comprises a specialized database for knowledge management that is human searchable and readable. Through the customer dashboard and knowledge base, the customer 134 can search and retrieve requisite information on the alert (blocks 426 and 430). Beneficially, this link between the customer 134 and knowledge base can allow the customer administrator to gain desired information regarding alerts, and their underlying errors, without the labor of independently searching for such information.

The knowledge base can further comprise a machine-readable portion that can be searched by the remote listener 132 to determine possible causes and solutions for the error. For example, the remote listener 132 can employ automated deductive reasoning in conjunction with the knowledge base to determine possible causes and solutions for the error.

At block 432, the remote listener 132, using the knowledge base and the alert, determines whether sufficient information is available to make a conclusion regarding the error. In one embodiment, a conclusion can comprise determining at least one possible source of the error. Optionally, the conclusion can further comprise one or more solutions. In another embodiment, the conclusion can comprise a determination that the knowledge base cannot reach a conclusion. If sufficient information is available to make a conclusion, the workflow 400 continues with block 436.

If the remote listener 132 determines that a conclusion can be reached with additional information, the workflow moves to block 434, where the remote listener 132 requests the additional information. In one embodiment, such information can be requested from the monitor agent 100A. In alternative embodiments, the information can be requested from a human monitor 104. In further embodiments, information can be requested from both the monitor agent 100A and human monitors 104. Upon receipt of the new, requested information, the workflow 400 returns to block 426, searching the knowledge base. The blocks of requesting and analyzing information (blocks 426, 432, 434) can be performed iteratively until the remote listener 132 reaches a conclusion. If a conclusion is reached by the remote listener 132, an e-mail message containing the conclusion and relevant analysis is sent to the appropriate customer contacts.

At block 436, it is determined whether a trouble report is opened. In one embodiment, the trouble report comprises a human actionable report that both instructs the monitor 104 to solve the problem, as well as disseminates information gathered to date by the remote listener 132. In one embodiment, the report can include, but is not limited to, a summary of the alert, the information gathered by the monitor agent 100A from the elements of the system 102, and the conclusions gathered by the remote listener 132 from the knowledge base. Based upon the information provided by the remote listener 132, the human monitor can decide to open a trouble report or not. If a trouble report is not opened, the alert is tagged (block 440), and the workflow 400 ends. If a trouble report is opened, the workflow 400 continues to blocks 442 and 444, where a trouble report is issued and tagged.

In alternative embodiments, the remote listener 132 can make the trouble report decision automatically. For instance, the remote listener 132 can determine from the knowledge base that the error is correctible without human intervention. The remote listener 132 then provides the monitor agent 100A with instructions drawn from the knowledge base to remedy the error. Alternatively, the error can be trivial and, therefore, ignored.

In another example, the remote listener 132 can decide to open a trouble report. For instance, the remote listener 132 can contain explicit instructions that errors of a certain nature are to be handled by human monitors 104. As above, if no trouble report is issued, then the alert is tagged at block 440 and the workflow 400 ends, while if a trouble report is issued, the workflow 400 moves to blocks 442 and 444, where a trouble report is opened and a tag is made.

In one embodiment, after opening the trouble report, a decision is made at block 446 regarding contacting the customer 134 through mechanisms other than the customer dashboard (block 446). In one embodiment, the customer is contacted at block 452 if they have contracted for a level of service that includes this option. Customer contact can include any known communication mechanisms, including, but not limited to, site visits, person to person telephone calls, computer automated telephone calls, voice mail messages, instant messaging, text messaging, electronic mail, combinations of the same and the like. In an alternative embodiment, the customer 134 is not contacted, other than through the dashboard, and the trouble reporting workflow ends at block 450.

Figure 5A:
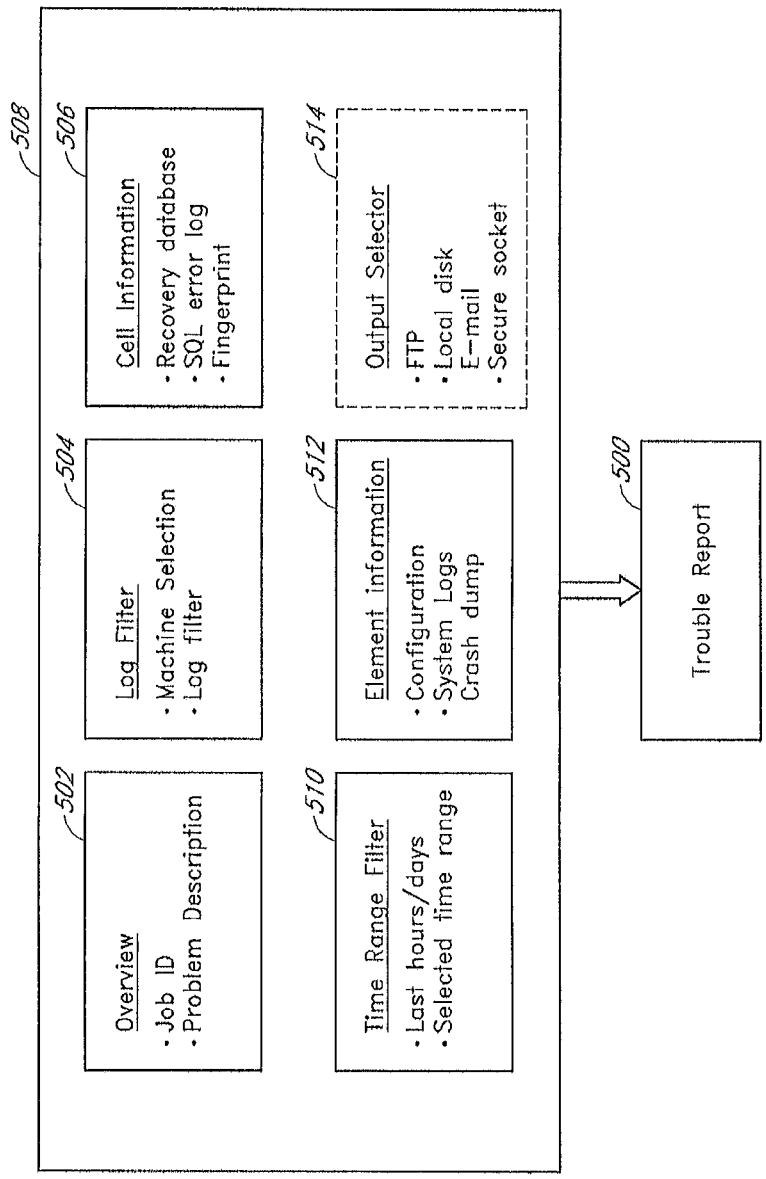
FIG. 5A is a schematic illustration of one embodiment of a problem report for distribution to a remote monitor.

FIG. 5A illustrates one schematic embodiment of a graphical user interface or dashboard 508 of the data migration system 102. As discussed below, the interface 508 allows the customer administrator to select, in advance of trouble report generation, how the reporting manager 100 or remote listener 132 will assemble the information provided to the remote monitor 104. It should be understood that the trouble report 500 can contain any combination of the options discussed below. Further, the report 500 is not limited to these options but may be expanded, as necessary, through hardware, software, and firmware improvements to the automated reporting system.

It may be further understood that the report 500 can also be arbitrarily generated by the administrator's discretion. For example, the administrator can schedule periodic report generation in the absence of detected errors in order to provide selected information regarding the hardware, software, and firmware of the data migration system to the remote monitor.

In one embodiment, the interface 508 includes tabbed windows, dividing the selectable report parameters into broad sections. Advantageously, this interface 508 enhances the ease with which the administrator can customize the report. In a non-limiting embodiment, the sections, discussed in greater detail below, can comprise: an overview 502, a log summary 504, cell information 506, a time range filter 510, and element information 512, and, optionally, an output selector 414. In the discussion, below, the sections of the report 500 and the tabbed windows of the interface 508 are referred to interchangeably, as the selections within the interface 508 give rise to the sections presented in the report 500.

The overview 502 of the report 500 provides the monitor 104 with a summary of the problems which prompted the generation of the report 500. The overview 502 can include a subject that comprises a unique ticket number or job ID that identifies the particular data migration process which failed. The overview 502 can further comprise a description of the problem, as determined by analysis of the information received from the cells 106. The description can stress specific information needed for troubleshooting, which can include, but is not limited to, combinations of specific hardware, software, and firmware involved in the data migration problem, the specific data migration process which has failed, and communication link problems within the system. Advantageously, the overview 502 allows the monitor 104 to ascertain, quickly, the specific reasons for the problem report 500 rather than laboriously analyzing the log files 300 generated by the selected elements, hastening problem resolution.

The log window 504 provides the customer administrator control over the logs provided to the monitor 104. These logs 300 can comprise any of the logs 300 generated by the elements during data migration operations. In general, the logs 300 comprise lists of data migration operations performed, containing information which can include, but is not limited to, a job ID for the operation, a cell ID for the cell in which the operation was performed, a element ID for the elements on which the operation was performed, and acknowledgement that the job was completed. In one embodiment, the logs 300 can comprise logs generated by the CommVault GALAXY system.

In one embodiment, the customer administrator can use the log window 504 to filter the logs 300 provided to the monitor 104 in the report 500. For a monitor 104 to review all the logs 300 of all the elements involved in the data migration system for problem resolution would be a significant, time consuming task, as much of the content of the logs 300 may not be relevant to the problem at hand. Furthermore, the logs 300 can reveal information about the data migration system or computer network that the customer administrator may not wish to be disseminated. Thus, to save time and resources, as well as improve the security of the data migration system, the customer administrator can select from several options for how the logs 300 are filtered when reporting to the monitor 104.

In one embodiment, the customer administrator can select which elements are included in the report 500. For example, the customer administrator may wish to omit information regarding a particular computer for security reasons. Alternatively, the administrator may generally have reason to believe that logs 300 from certain elements do not need to be reported. Choosing this option, all of the log files 300 generated by the data migration system from the selected elements will be provided, such as GALAXY logs.

In further embodiments, the logs 300 can be provided based on the job IDs they contain. When this option is selected, the reporting manager 100 or monitor agent 100A searches the logs 300 of the elements for specific job ID numbers. Then, the reporting manager 100 or remote listener 132 includes only the log lines related to the job ID in the report.

Advantageously, the job ID and element filters allow the customer administrator significant flexibility in tailoring the logs 300 provided to the monitor 104. For example, if problems that occur throughout the data migration system 102 are a concern, the customer administrator can select to allow all logs 300 from elements involved in the failure process. Alternatively, if security is a primary concern, the customer administrator can select to allow only log fragments from certain computers to be viewed by the monitor 104. The administrator can further loosen these restrictions in subsequent reports, as necessary, should the monitor 104 require more information than provided. This flexibility allows the customer administrator to balance the amount of information released to facilitate problem evaluation and problem solving with security concerns.

In one embodiment, the cell window 506 allows the customer administrator to permit the reporting manager 100 or monitor agent 100A to provide information regarding a disaster recovery database in the report 500. At least a portion of this database can comprise meta-data regarding the client environment, or data regarding the data contained within the client environment. When the client environment sufferers a problem, this database can be utilized to recreate the client environment in a properly operating state.

The cell window 506 can further allow the customer administrator the option to include SQL error logs in the report. The errors logged may generally comprise system and user-defined events that occur on an SQL server, and more specifically, errors in data retrieval operations in SQL Server. In one non-limiting example, a Microsoft SQL server using the CommVault SIMPANA system can provide all files with the name ERRORLOG.<NUM>, where <NUM> is the number of the selected error log, under SQL path retrieved by the registry SOFTWARE\\Microsoft\\Microsoft SQL Server\\COMMVAULTQINETIX\\Setup\\SQLPath.

The cell information 506 can further contain fingerprints, as discussed above, for the machines discussed in the report 500.

The time range filter 510 allows the customer administrator to filter the report 508 based on a selected time period. In one embodiment, the time range filtering is optional, and can be disabled when the customer administrator elects to provide logs 300 by job ID, as discussed above. In another embodiment, the time range can comprise a selected time period prior to generation of the report 500, such as the last 24 hours. In an alternative embodiment, the customer administrator can provide information in the report over a selected, arbitrary time range.

Time filtering allows the customer administrator further control over the information provided to the remote monitor 104. In one embodiment, this mechanism of filtering can be useful when problems are most easily tracked and solved chronologically. In an alternative embodiment, the customer administrator can allow access to logs 300 relevant to a particular time to a monitor 104 experienced in solving the type of problem occurring over that time period. Dividing the logs 300 in this manner allows troubleshooting resources to be allocated by the customer administrator where they are needed. In a further embodiment, in the case where multiple monitors 104 work on a problem, time filtering can be used to divide the problem report 500 into sections based on a time period such that monitors 104 may only be provided pieces of the problem, giving the customer administrator greater control over security of the report information.

The element information section 512 of the interface 508 further allows the customer administrator to provide information specific to the elements involved in the failed data migration operation such as element hardware, software and firmware configurations, system logs, and crash dumps. Non-limiting examples of the element hardware, software, and firmware configurations are: processor type, processor speed, operating system, physical memory, available memory, available virtual memory, element name, IP address, time zone, and the version of the data migration software operating on the element. Non-limiting examples of system logs are: System/Application Event Logs (Microsoft Windows), /var/adm/messages* and /etc/system (Sun Microsystems Solaris), "errpt-a" output (IBM AIX), files similar to /etc/system (Linux and HP-UX) and abend logs (Novell Netware). Non-limiting examples of the crash dump information are the Dr. Watson log (Microsoft Windows) and a list of core files and the name of the executables which caused the core (Unix). Advantageously, this element information allows the monitor 104 to determine if hardware or software associated with the element operation, as separate from the data migration process, can be responsible for data migration problems.

The output selector 514 allows the administrator to determine the manner in which the report 508 is provided to the remote monitor. In one embodiment, the output can comprise at least one of upload to an FTP location, an electronic mail message with the subject line of the job ID or ticket number, and saving to a local directory. Advantageously, this flexibility in the delivery mechanism of the report 500 allows the report 500 to be provided in the manner that is most appropriate to the circumstances of the data migration system. For example, if one line of communication is unavailable, inaccessible, or insecure, the report may still be provided, enhancing the robustness of the problem reporting manager.

In one embodiment, the output selector 514 further allows the customer administrator to select a size limit for the e-mail which is sent containing the report 500. Often e-mail systems are limited from sending or receiving e-mail messages over a certain size. Further, depending on the nature of the problem within the system, the report 500 can be relatively large. Thus, when a limit is specified, the reporting manager can check the final report 500 size against the selected limit. If the size of the report 500 exceeds the limit, the report 500 can be split into multiple CAB files, each with a size less than the limit. In this case, multiple e-mails are then sent containing the smaller CAB files. Optionally, a utility can be provided to the remote monitor for re-assembly of the CAB files. Advantageously, this size flexibility enhances the robustness of the reporting system, ensuring that the e-mails are not delayed or rejected because of their size during their transmission or receipt.

In alternative embodiments, the selections available through the output selector 514 can be limited, for security reasons. For example, the output selector may be limited to transmissions through secure sockets.

Figure 5B:
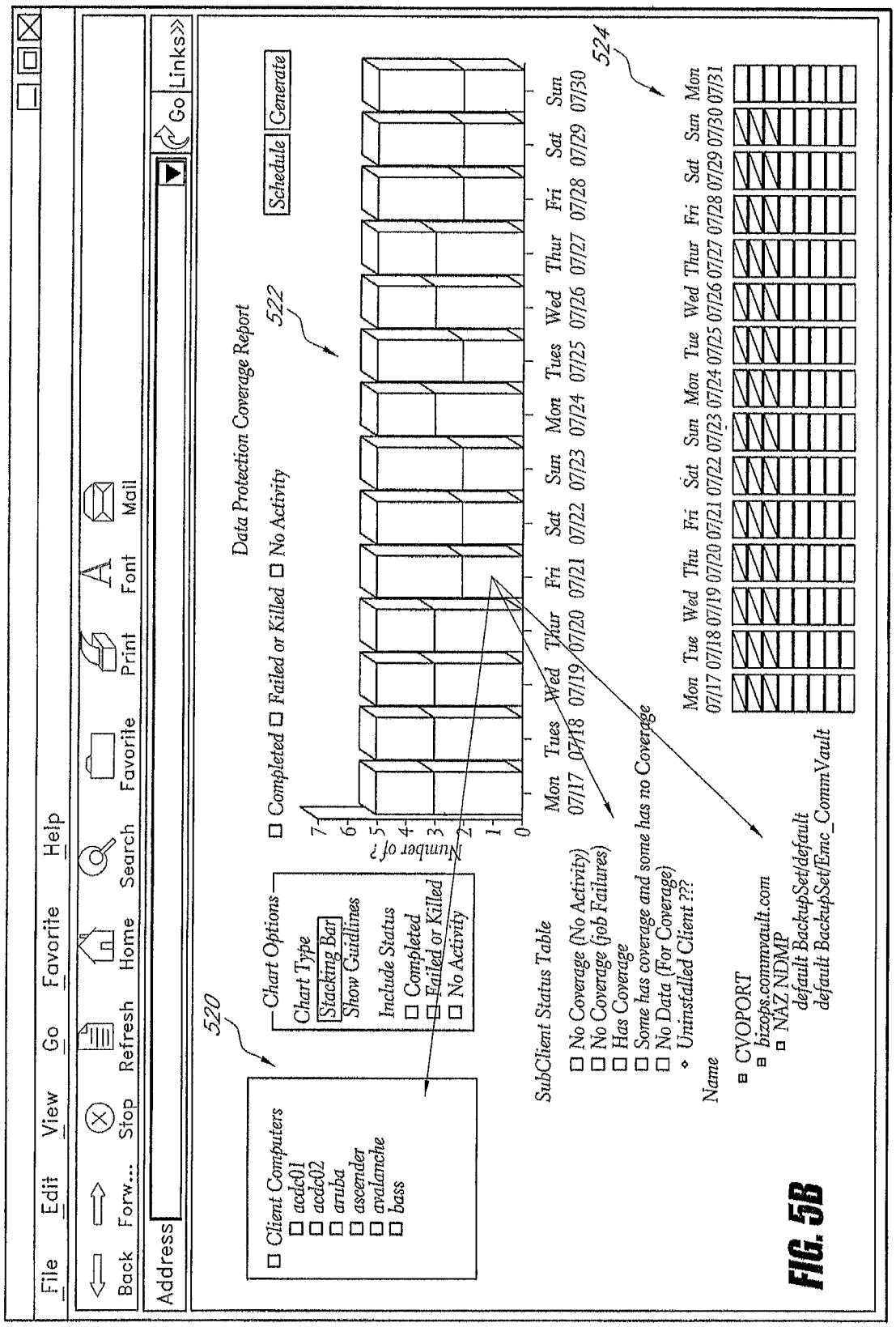
FIG. 5B illustrates one embodiment of a graphical display of at least a portion of the report received by the remote monitor.

FIG. 5B illustrates one embodiment of a graphical display 516 of at least a portion of the information contained within the report 500 received by the remote monitor 104, for example, coverage status. In one aspect, the display 516 contains a list 520 of the machines for which information is provided in the report. Selection of a machine on the list 520 causes information for that machine to be displayed. One set of information displayed can comprise jobs, or sub-clients, which are active on the selected machine. The report 500 can provide a summary 522 of the number of jobs performed on the selected machine over a selected time period. The summary 522 can include, but is not limited to, the number of successfully completed jobs, number of failed jobs, number of inactive jobs. Display 516 can further provide a breakdown 524 of the status of the individual jobs over the selected time period.

EXAMPLES

In the following examples, circumstances in which problem reports 500 may be generated are discussed. In general, the examples illustrate the wide range of problems which may be automatically identified and reported through embodiments of the automated problem reporting systems 102, 102A and further illustrate how the problem report 500 may be utilized by computer professionals to identify and resolve problems more quickly and easily than through conventional, manual problem resolution. These examples are discussed for illustrative purposes and should not be construed to limit the embodiments of the invention.

Example 1: Mechanical Failure

In one embodiment, the reporting manager 100 or monitor agent 100A may monitor or be alerted to the physical status of the elements of the data migration system and issue a problem report 500 when a mechanical failure occurs. For example, media agents 114 perform copy or restore operations in response to instructions from storage managers 110. The data to be archived or recovered may reside on media such as a tape or optical disk that is mechanically retrieved, such as with a mechanical arm, and loaded into a storage volume 116 for access. This mechanical operation, however, may fail if the mechanical arm fails to actuate properly.

Should the mechanical arm fail to operate properly, the media agent 114 alerts one or more associated storage managers 110, which in turn provides the alert to the reporting manager 100 or monitor agent 100A, which triggers generation of a problem report. For example, the reporting manager 100 or the monitor agent 100A, under instructions from the remote listener 132, may gather information regarding the storage volume 116 and monitor agent 110, the machine and cell containing the storage volume 116 and storage manager 110 (or monitor agent 100A), as well as associated logs 300. The reporting manager 100 or remote listener 132 may then apply the reporting selections entered in the interface 508 for use in preparing the trouble report 500. The filtering options selected by the customer administrator will determine the information provided in the report. In one example, the summary of the report 500 may contain the job ID for the data migration function that has failed and a description stating that the storage volume at issue experienced a hardware problem.

The report 500 can be communicated to the monitor and/or the customer 134. In one embodiment, such communication may comprise at least one of the mechanisms selected within the output selector 514. For example, the customer dashboard 508 can be updated with this information, along with suggested remedies that the customer administrator may execute. Upon review of the report, the customer administrator and/or monitor 104 may determine that a mechanical failure has occurred in one or more storage volumes 116 by review of the summary and bundled files.

The report 500 can also comprise suggested remedies for the problem. Examples of remedies can include scheduling the data migration operation to be performed on another storage volume, repairing or replacing the mechanical system that has failed, cancelling the data migration operation, combinations of the same or the like. In alternative embodiments, the monitor 104 may additionally initiate further communication with the customer administrator for discussion of additional remedies. In further alternative embodiments, if the monitor possesses sufficient access privileges, the monitor may perform problem resolution themselves.

Example 2: Network Connectivity

In one embodiment, the reporting manager 100 or monitor agent 100A may monitor or be configured to receive alerts regarding errors which occur during use of the communications links 130. For example, when a client 112 requests archived files, the client 112 communicates with a storage manager 110, which then issues instructions to the appropriate media agent 114 to retrieve the requested data and transmit the data to the client 112. Often, these various functions are performed on different machines. Thus, when disruptions occur in the communication links 130 between the client 112 and storage manager 110, the storage manager 110 and media agent 114, or the media agent 114 and client 112 due to hardware or software problems, data migration operation may not be performed correctly.

Depending on the severity of the connectivity problem, the reporting manager 100 or remote listener 132 may trigger the generation of the problem report 500. The reporting manager 100 or monitor agent 100A gathers information which may include, but is not limited to, information regarding hardware, software, and firmware settings, as well as appropriate logs 300, of the remote monitor 104 or monitor agent 100A itself, the media agent 114, storage manager 110, and client computer 112. The reporting manager 100 or remote listener 132 may then apply the reporting selections entered in the interface 508 and issue the report 500. In certain embodiments, the filtering options selected by the customer administrator determine the information provided in the report. For example, the summary of the report 500 may contain the job ID for the scheduled retrieval function and a description stating that a network connectivity problem is at issue.

The report 500 may be communicated to the monitor 104 and/or the customer 134. In one embodiment, such communication may comprise at least one of the mechanisms selected within the output selector 514.

The report 500 can also comprise suggested remedies for the problem. Examples of remedies may include checking the network configuration within the operating system and data migration software of the elements involved in the failed process. Remedies may further include checking the status of the network hardware and physical network connections of the elements involved in the failed process. In alternative embodiments, the monitor 104 may additionally initiate further communication with the customer administrator to discuss further remedies. In further alternative embodiments, if the monitor 104 possesses sufficient access privileges, the monitor 104 may perform problem resolution.

Example 3: Acknowledgement Failure

In one embodiment, the reporting manager 100 or monitor agent 100A may be alerted to errors occurring in data migration operations conducted between cell elements. As described above, agents, such as the media agents 114, are responsible for executing data migration operations designated by the storage manager 110. When data is migrated under normal operations, the relevant agent receives instruction from the storage manager 110, identifies the location of the data from the relevant database 120A, performs the designated migration operation, updates the location of the migrated data in the agent database 120 for later reference, and provides an acknowledgement of the operation to the storage manager 110.

In the event that one or more blocks in this process are not successfully completed, the media agent 114 may fail to acknowledge the completion of the data migration operation. In one embodiment, this error initiates the problem reporting process, where the reporting manager 100 or remote listener 132 may request more information to determine whether to generate a problem report 500. For example, the remote monitor 100 or monitor agent 100A may contact the storage manager 110 to obtain log files and hardware, software, and firmware configurations for the machines containing the storage managers 110 and media agents 114 involved in the failed process. Similar information may also be gathered for the reporting manager 100 or monitor agent 100A itself.

Upon receipt of this information, the reporting manager 100 or remote listener 132 applies programming or other logic to the received information to determine the problem, applies the selection criteria entered in the interface 508 for reporting, and issues the problem report 500. For example, the remote listener 132 can utilize the knowledge base in conjunction with discovered error codes, as discussed above. The filtering options selected by the customer administrator will determine the information provided in the report. In one example, the summary of the generated report 500 contains the job ID for the scheduled data migration operation and a description stating that an acknowledgement failure is at issue.

The report 500 may be communicated to the monitor 104 and/or the customer 134. In one embodiment, such communication may comprise at least one of the mechanisms selected within the output selector 514. For example, the customer dashboard 508 may be updated with this information, along with suggested remedies that the customer administrator may execute. For example, the received information on the media agent 114 and storage device 116 may be reviewed in greater depth to determine if an identifiable hardware or software failure has occurred in either element. Examples of checking hardware errors may include examining the network connectivity of the media agent 114 and storage device 116 and the mechanical status of the storage device 116 as discussed above. Examples of checking software errors may include examining the file system for problems, such as corrupted databases, a file pathway that cannot be determined, or other problems opening or writing files and directories, as well as incompatibilities between the server a restore is attempted on and the server from which the files originated. In alternative embodiments, the monitor 104 can additionally initiate further communication with the customer administrator to discuss further remedies. In further alternative embodiments, if the monitor 104 possesses sufficient access privileges, the monitor 104 can perform problem resolution actions.

Example 4: Problem Prediction

In one embodiment, the problem reporting systems 102, 102A may also issue problem reports 500 based upon predicted problems. For example, an element of the data migration system 102, such as a storage manager 110 or master storage manager 122, may record the rate at which data is stored on a storage volumes 116A, 116B and/or have access to historical records of the same, as well as monitor the capacity of storage volumes 116A, 116B within the data migration system. For instance, the system may predict, based upon trends in storage usage and the present capacity of the storage volume, the available storage capacity on the selected day and generate an alert if the size of the scheduled backup exceeds the space predicted to be available.

In response to the alert, the problem evaluation and reporting process is initiated by the reporting manager 100 or monitor agent 100A. The reporting manager 100, or monitor agent 100A at the instruction of the remote listener 132, may subsequently gather information from the storage volume 120, the machine containing the storage volume 120, the cell 106 containing the storage volume 120, and/or associated logs 300 for each, as well as information and/or log files 300 for the machine containing the reporting manager 100 or monitor agent 100A. The reporting manager 100 or remote listener 132 may then apply the selections entered in the interface 508 for reporting and issue the report 500. The summary of the report 500 may contain the job ID for the scheduled data migration function and a description stating that the storage volume 120 at issue may not possess sufficient capacity for the data migration.

Advantageously, this predictive capability allows problems to be prevented before they occur. The report 500 can be communicated to the monitor 104 and/or the customer 134. In one embodiment, such communication may comprise at least one of the mechanisms selected within the output selector 514. For example, the customer dashboard 508 may be updated with this information, along with suggested remedies that the customer administrator may execute. The summary description may allow the monitor 104 and/or customer administrator to quickly determine that the storage capacity of one or more storage volumes 116A, 1168 is the cause of the problem report 500, rather than reviewing a large amount of log files 300 to determine the same.

The report 500 may also comprise suggested remedies for the problem. Examples of remedies may include scheduling the data migration operation to be performed on another storage volume 116A, 1168, installing a new storage volume 120, deleting unnecessary files on the storage volume 116A, 1168 to provide additional capacity, or cancelling the data migration operation. In alternative embodiments, the monitor 104 may additionally initiate further communication with the customer administrator to discuss further remedies. In further alternative embodiments, if the monitor 104 possesses sufficient access privileges, the monitor may perform problem resolution themselves.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of error reporting in a computer network, the method comprising:
   by computing devices comprising computer hardware:
      monitoring, with one or more first devices, one or more data operations, wherein the one or more first devices have access privileges to data being operated by the one or more data operations;
      detecting, with the one or more first devices, at least one error associated with a failed performance of the one or more data operations;
      determining that the at least one error is to be forwarded to one or more second devices that do not possess access privileges to data that is a subject of the one or more data operations;
      causing the one or more second devices to receive diagnostic information,
         wherein the diagnostic information comprises information about the failed performance of the one or more data operations; and
      in response to receiving diagnostic information, with the one or more second devices:
         consulting an index to determine one or more error response instructions based at least in part on the diagnostic information,
            wherein the consulting is initiated and executed by the one or more second devices;
         in response to determining the one or more error response instructions, automatically issuing, with the one or more second devices, the one or more error response instructions to the one or more first devices; and
         in response to failing to determine an error response based at least in part on the diagnostic information, reporting the failed performance of the one or more data operations to a customer administrator.

2. The method of claim 1 wherein the one or more first devices assemble the diagnostic information into a report and provide the report to the one or more second devices.

3. The method of claim 1 wherein detecting the error includes receiving at least one error message.

4. The method of claim 1 further comprising requesting at least a portion of the diagnostic information, wherein the diagnostic information requested is determined based at least in part on information in the index.

5. The method of claim 1 wherein the one or more second devices prioritize an error report, wherein the error report is provided to the one or more second devices as part of an ordered queue of error reports.

6. The method of claim 1 wherein monitoring the one or more data operations comprises monitoring at least one of following types of information: file type distribution, file size distribution, distribution of access time, distribution of modification time, distribution by owner, capacity of storage media, asset reporting by host, disk, or partition, and availability of resources, disks, hosts, and applications.

7. The method of claim 1 wherein the one or more second devices generate an error report based upon selection criteria provided by an administrator.

8. The method of claim 1 wherein the one or more second devices generate an error report without human intervention.

9. A data storage system, the system comprising:
   one or more first devices comprising computer hardware configured to:
      monitor one or more data operations,
      detect at least one error associated with a failed performance of the one or more data operations, and
      determine that the at least one error is to be forwarded to one or more second devices,
      cause the one or more second devices to receive diagnostic information; and
   one or more second devices comprising computer hardware configured to:
      receive the diagnostic information,
         wherein the diagnostic information comprises information about the failed performance of the one or more data operations, wherein data that is a subject of the one or more data operations is inaccessible to the one or more second devices,
using an index that comprises error response instructions, determine one or more error response instructions based on the received diagnostic information, and
in response to determining the one or more error response instructions, automatically issuing the one or more error response instructions to the one or more first devices,
in response to failing to determine an error response based at least in part on the diagnostic information, report the failed performance of the one or more data operations to a customer administrator.

10. The system of claim 9 wherein the one or more first devices assemble the diagnostic information into a report and provide the report to the one or more second devices.

11. The system of claim 9 wherein the one or more first devices detect the error by receiving at least one error message.

12. The system of claim 9 wherein the one or more second devices is further configured to request at least a portion of the diagnostic information, wherein the diagnostic information requested is determined based at least in part on information in the index.

13. The system of claim 9 wherein the one or more second devices prioritize an error report, wherein the error report is provided to the one or more second devices as part of an ordered queue of error reports.

14. The system of claim 9 wherein the one or more first devices monitor the one or more data operations by monitoring at least one of following types of information: file type distribution, file size distribution, distribution of access time, distribution of modification time, distribution by owner, capacity of storage media, asset reporting by host, disk, or partition, and availability of resources, disks, hosts, and applications.

15. The system of claim 9 wherein the one or more second devices generate an error report based upon selection criteria provided by an administrator.

16. The system of claim 9 wherein the one or more second devices generate an error report without human intervention.

* * * * *